(12) United States Patent
Habibi

(10) Patent No.: US 10,098,433 B2
(45) Date of Patent: Oct. 16, 2018

(54) ADJUSTABLE DIAMETER CYLINDRICAL MECHANISM

(71) Applicant: Masood Habibi, Beverly Hills, CA (US)

(72) Inventor: Masood Habibi, Beverly Hills, CA (US)

( * ) Notice: Subject to any disclaimer, the term of this patent is extended or adjusted under 35 U.S.C. 154(b) by 0 days.

(21) Appl. No.: 14/367,214

(22) PCT Filed: Oct. 31, 2012

(86) PCT No.: PCT/US2012/062868
§ 371 (c)(1),
(2) Date: Jun. 19, 2014

(87) PCT Pub. No.: WO2013/067058
PCT Pub. Date: May 10, 2013

(65) Prior Publication Data
US 2014/0366910 A1  Dec. 18, 2014

Related U.S. Application Data

(63) Continuation of application No. 13/664,074, filed on Oct. 30, 2012, now abandoned.
(Continued)

(51) Int. Cl.
A45D 1/04 (2006.01)
A45D 2/36 (2006.01)
(Continued)

(52) U.S. Cl.
CPC ............. *A45D 2/36* (2013.01); *A45D 2/2471* (2013.01); *A45D 20/48* (2013.01); *A45D 20/50* (2013.01);
(Continued)

(58) Field of Classification Search
CPC .......... A45D 2/36; A45D 20/00; A45D 20/08; A45D 20/48; A45D 20/50; A45D 20/52;
(Continued)

(56) References Cited

U.S. PATENT DOCUMENTS

| 5,020,552 A | 6/1991 | Hollenberg et al. |
| 5,212,366 A | 5/1993 | McDougall |

(Continued)

FOREIGN PATENT DOCUMENTS

| EP | 0 571 389 B1 | 6/1996 |
| KR | 2001-0092054 A | 10/2001 |

OTHER PUBLICATIONS

International Search Report and Written Opinion in International Application No. PCT/US2012/062868, dated Mar. 27, 2013.

*Primary Examiner* — Rachel Steitz
(74) *Attorney, Agent, or Firm* — One LLP; Jonathan Jaech

(57) ABSTRACT

An adjustable diameter mechanism includes a plurality of cylinder portions, each of the cylinder portions comprising an arcuate portion of a cylinder and extending along an arc of less than or about 120 degrees of a 360 degree circle and having an inner side and an outer side. The inner side of the cylinder portions are coupled to first ends of a scissors mechanism at a pivot point and a slot of the cylinder portions, the scissors mechanism having a first and a second piece pivotally coupled at a pivot coupling, respective second ends of the scissors mechanism coupled to a respective pair of threaded bolts engaged with a screw having opposing threads meeting at a central point thereof.

7 Claims, 41 Drawing Sheets

Related U.S. Application Data

(60) Provisional application No. 61/553,850, filed on Oct. 31, 2011.

(51) Int. Cl.

| | | |
|---|---|---|
| *A45D 20/52* | (2006.01) | |
| *A45D 24/04* | (2006.01) | |
| *A45D 2/24* | (2006.01) | |
| *A45D 20/50* | (2006.01) | |
| *A46B 3/00* | (2006.01) | |
| *A46B 5/00* | (2006.01) | |
| *A46B 7/02* | (2006.01) | |
| *A46B 9/02* | (2006.01) | |
| *A46B 13/02* | (2006.01) | |
| *A46B 15/00* | (2006.01) | |
| *A45D 20/48* | (2006.01) | |
| *F16H 21/50* | (2006.01) | |
| *F16H 25/14* | (2006.01) | |
| *F16H 37/12* | (2006.01) | |
| *F16H 25/20* | (2006.01) | |

(52) U.S. Cl.
 CPC ........... *A45D 20/52* (2013.01); *A45D 20/525* (2013.01); *A45D 24/04* (2013.01); *A46B 3/005* (2013.01); *A46B 5/0041* (2013.01); *A46B 7/023* (2013.01); *A46B 9/023* (2013.01); *A46B 13/02* (2013.01); *A46B 13/023* (2013.01); *A46B 15/003* (2013.01); *F16H 21/50* (2013.01); *F16H 25/14* (2013.01); *F16H 37/124* (2013.01); *F16H 2025/2059* (2013.01); *Y10T 74/18168* (2015.01)

(58) Field of Classification Search
 CPC .. A46B 7/00; A46B 7/02; A46B 7/023; A46B 9/023; A46B 9/08; A46B 9/10; A46B 2200/104; A46B 5/0041; A46B 15/003; A46B 13/023; F16H 37/124; F16H 2025/2059; Y10T 74/18168
 See application file for complete search history.

(56) References Cited

U.S. PATENT DOCUMENTS

| | | | |
|---|---|---|---|
| 6,725,495 | B1 | 4/2004 | Habibi |
| 7,363,676 | B1 * | 4/2008 | Habibi .................... 15/160 |
| 8,881,739 | B2 * | 11/2014 | Kim et al. ................ 132/118 |
| 2008/0041406 | A1 | 2/2008 | Le |
| 2011/0290471 | A1 * | 12/2011 | Cutts ..................... 166/85.3 |
| 2013/0340782 | A1 * | 12/2013 | Ragosta et al. ........... 132/200 |

* cited by examiner

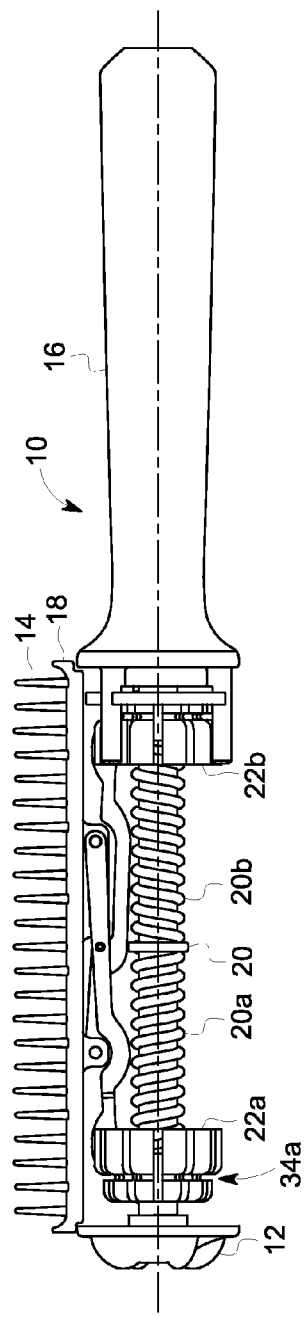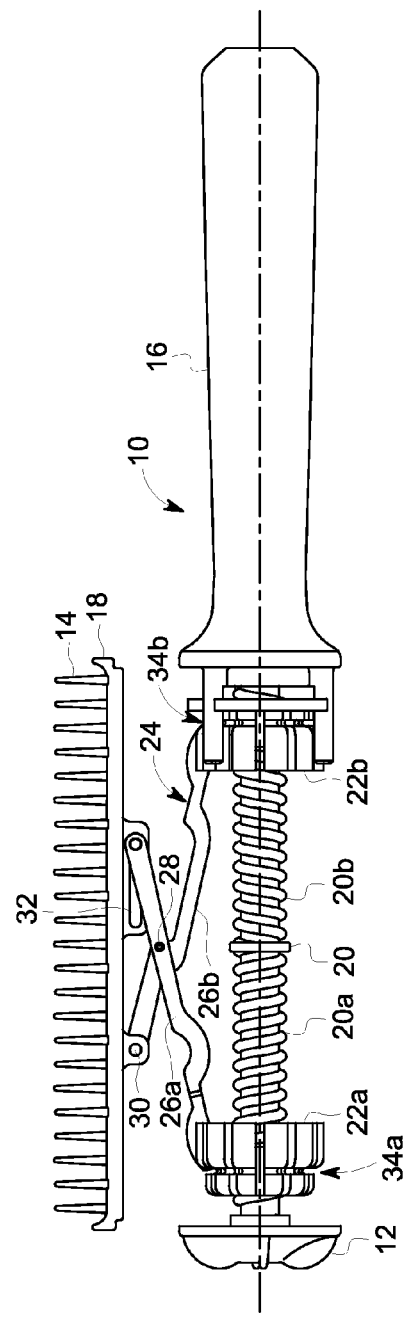

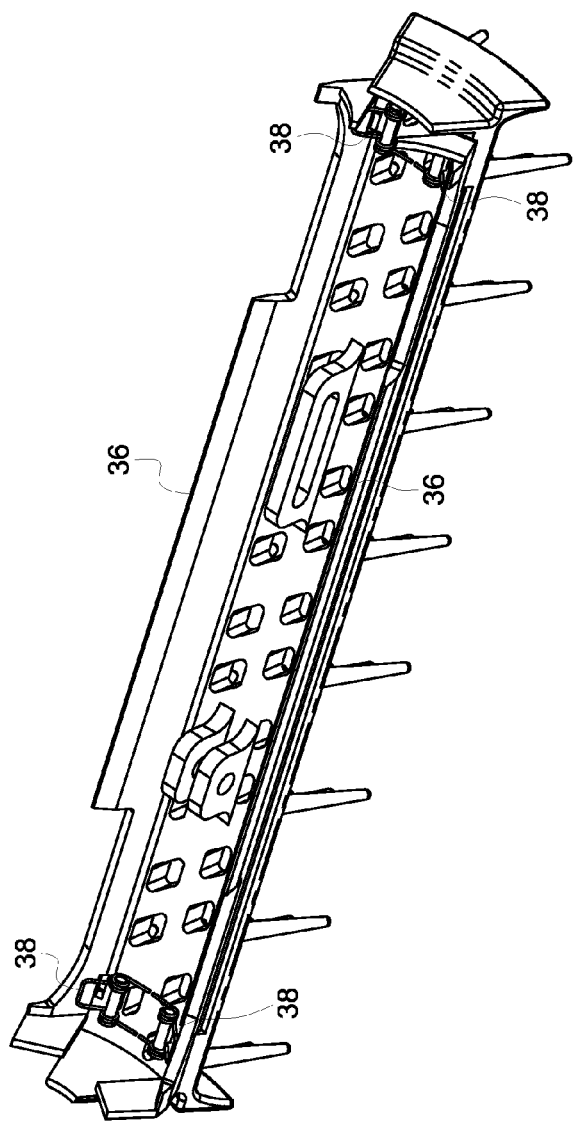
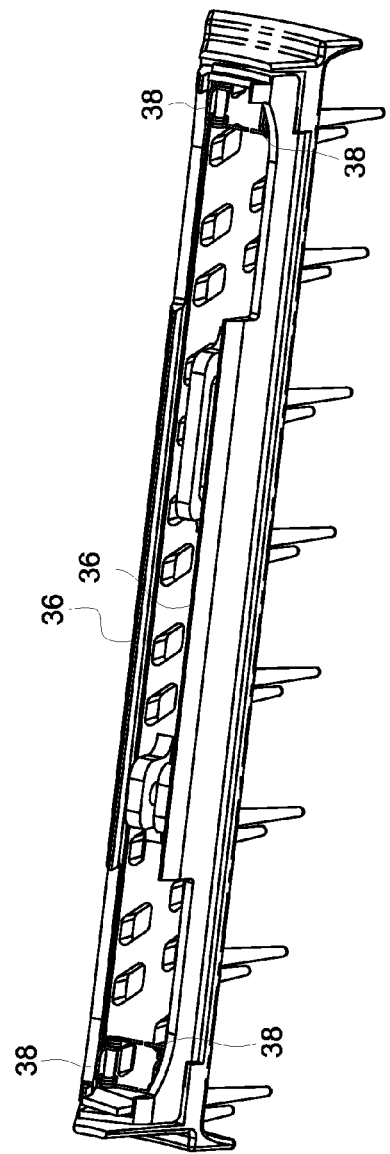
FIG. 7A
FIG. 7B

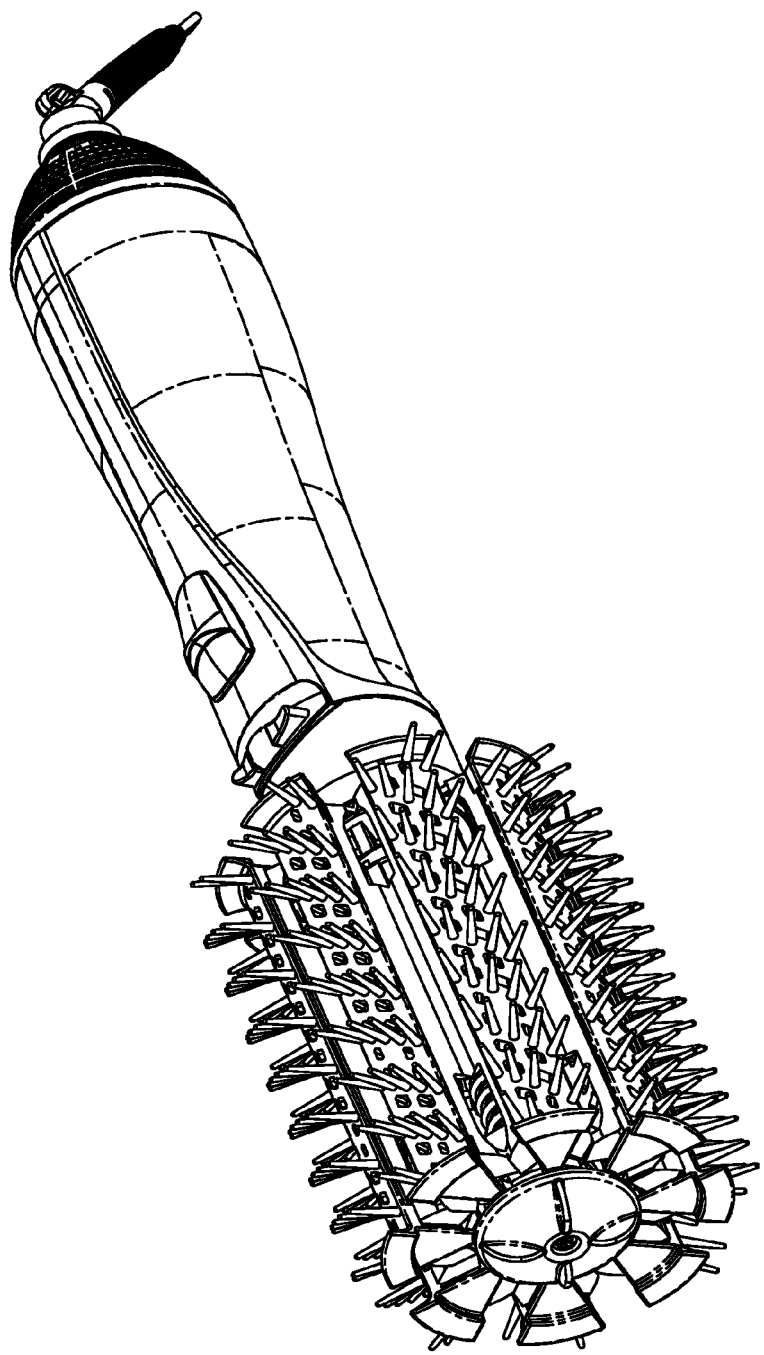

ADJUSTABLE DIAMETER CYLINDRICAL MECHANISM

This patent application is a United States National Stage Application filed under 35 U.S.C. § 371 of International Application No. PCT/US2012/062868, entitled "Adjustable Diameter Cylindrical Mechanism" which was filed on Oct. 31, 2012, which claims priority to U.S. patent application Ser. No. 13/664,074, filed Oct. 30, 2012 and U.S. Patent Application No. 61/553,850, filed Oct. 31, 2011.

STATEMENT OF RELATED APPLICATIONS

The present application claims the benefit of priority based on commonly owned U.S. Provisional Patent Application Ser. No. 61/553,850 filed on Oct. 31, 2011 in the name of the same inventor and having the same title, the contents of which are hereby incorporated herein by reference as if set forth fully herein.

TECHNICAL FIELD

The present disclosure is directed generally to the field of hair styling. More particularly it is directed to adjustable diameter mechanisms useable with curlers, brushes, hair dryers and the like used in the hair styling process.

OVERVIEW

An adjustable diameter mechanism includes a plurality of cylinder portions, each of the cylinder portions comprising an arcuate portion of a cylinder and extending along an arc of less than or about 120 degrees of a 360 degree circle and having an inner side and an outer side. The inner side of the cylinder portions are coupled to first ends of a scissors mechanism at a pivot point and a slot of the cylinder portions, the scissors mechanism having a first and a second piece pivotally coupled at a pivot coupling, respective second ends of the scissors mechanism coupled to a respective pair of threaded bolts engaged with a screw having opposing threads meeting at a central point thereof.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 is a side elevational view of the embodiment of FIG. 1 with a single plate installed and in a fully retracted position.

FIG. 4 is a side elevational view of the embodiment of FIG. 1 with a single plate installed and in a fully extended position.

FIGS. 7A and 7B are front perspective views illustrating optional side flaps in a fully extended position (7A) and a fully retracted position (7B).

FIGS. 31A and 31B are front perspective views of the embodiment of FIG. 28 illustrating the hairbrush component in a fully extended configuration.

DESCRIPTION OF EXAMPLE EMBODIMENTS

Example embodiments are described herein in the context of adjustable diameter mechanisms useable with curlers, brushes, hair dryers and the like used in the hair styling process. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Reference herein to "one embodiment" of "an embodiment" or "one implementation" or "an implementation" means that a particular feature, structure, part, function or characteristic described in connection with the embodiment can be included in a least one embodiment of the invention. The appearances of phrases such as "in one embodiment" or "in one implementation" in different places within this specification are not necessarily all referring to the same embodiment or implementation, nor are separate and alternative embodiments necessarily mutually exclusive of other embodiments.

Figure 1:
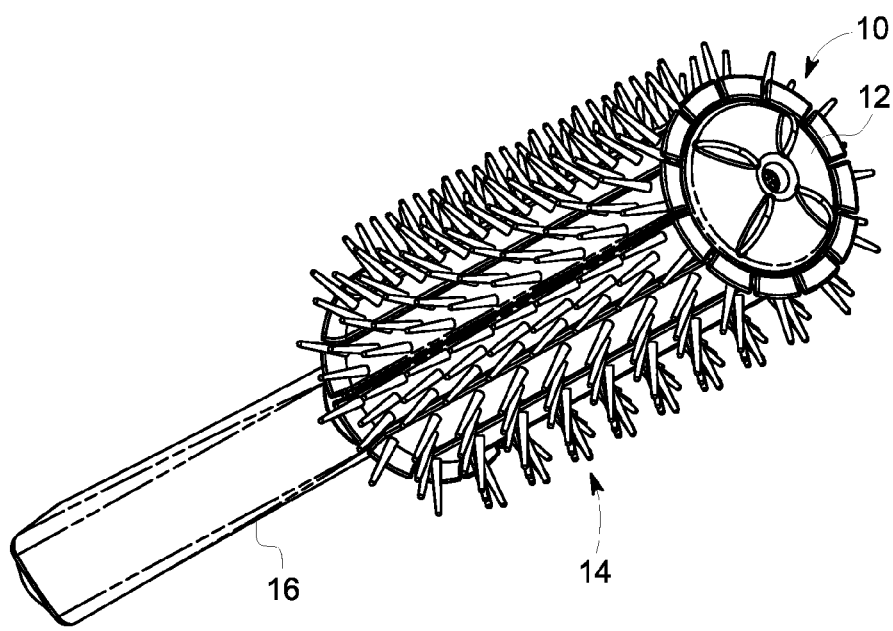
FIG. 1 is a front perspective view of one embodiment of the present invention configured as an adjustable diameter hair brush in a fully retracted position.

Turning to the drawings, FIG. 1 is a front perspective view of one embodiment 10 of the present invention configured as an adjustable diameter hair brush in a fully retracted position.

Figure 2:
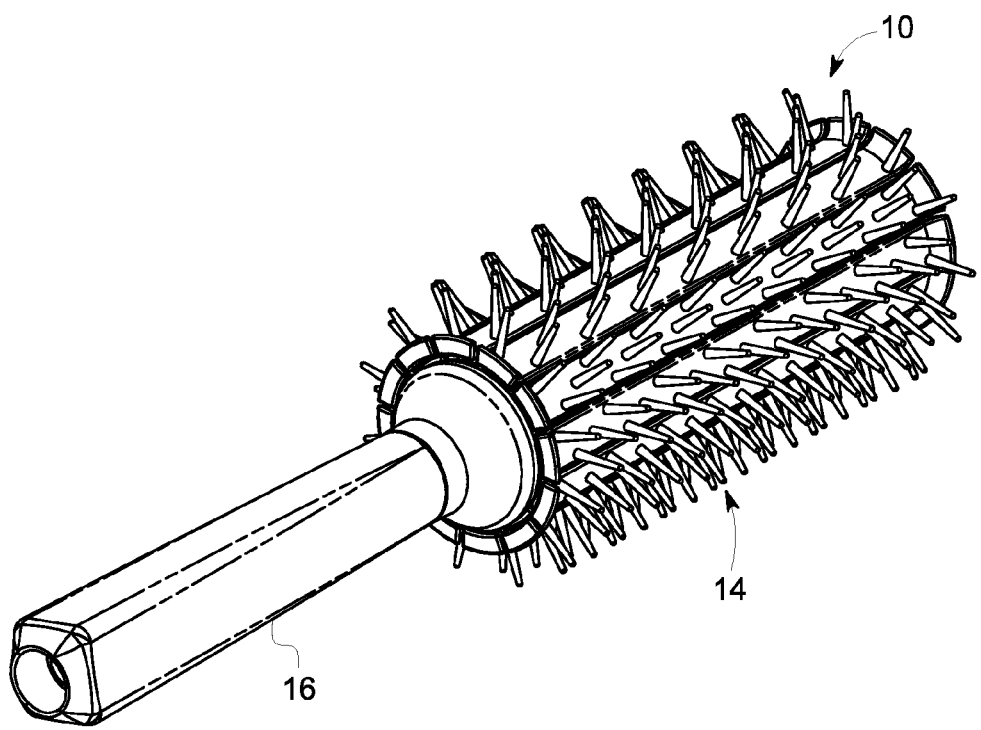
FIG. 2 is a rear perspective view of the embodiment of FIG. 1 in a fully retracted position.

FIG. 2 is a rear perspective view of the embodiment 10 of FIG. 1 in a fully retracted position. In accordance with this embodiment rotating knob 12 adjusts the diameter of the hair brush 10. Hair brush 10 has flexible (or non-flexible) prongs 14 at its outer periphery for engaging the hair and a handle 16.

FIG. 3 is a side elevational view of the embodiment of FIG. 1 with a single plate 18 installed and in a fully retracted position.

FIG. 4 is a side elevational view of the embodiment of FIG. 1 with a single plate 18 installed and in a fully extended position. As can be seen, rotation of knob 12 causes screw body 20 which has a pair of opposed threaded sections 20a and 20b to draw engaged nuts 22a, 22b toward or apart from one another so as to extend or retract plates 18. Plates 18 are coupled to nuts 22a, 22b with a scissors type of mechanism 24 having a pair or arms 26a, 26b coupled together at a pivot point 28 and coupled to the plates 18 at a pivot 30 and a slot 32. The scissors mechanisms 24 are coupled to nuts 22a, 22b with bands (40 in FIG. 8B) which fit in corresponding slots 34a, 34b to retain the respective ends of the scissors mechanisms 24 in the slots 34a, 34b during movement of the mechanism.

Figure 5:
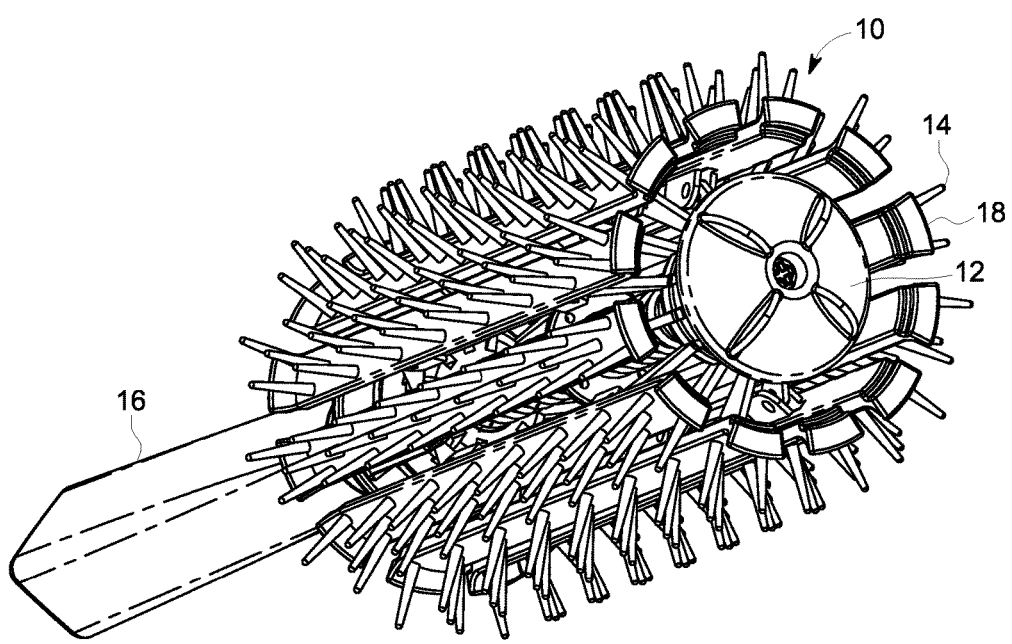
FIG. 5 is a front perspective view of the embodiment of FIG. 1 in a fully extended position.

FIG. 5 is a front perspective view of the embodiment of FIG. 1 in a fully extended position.

Figure 6:
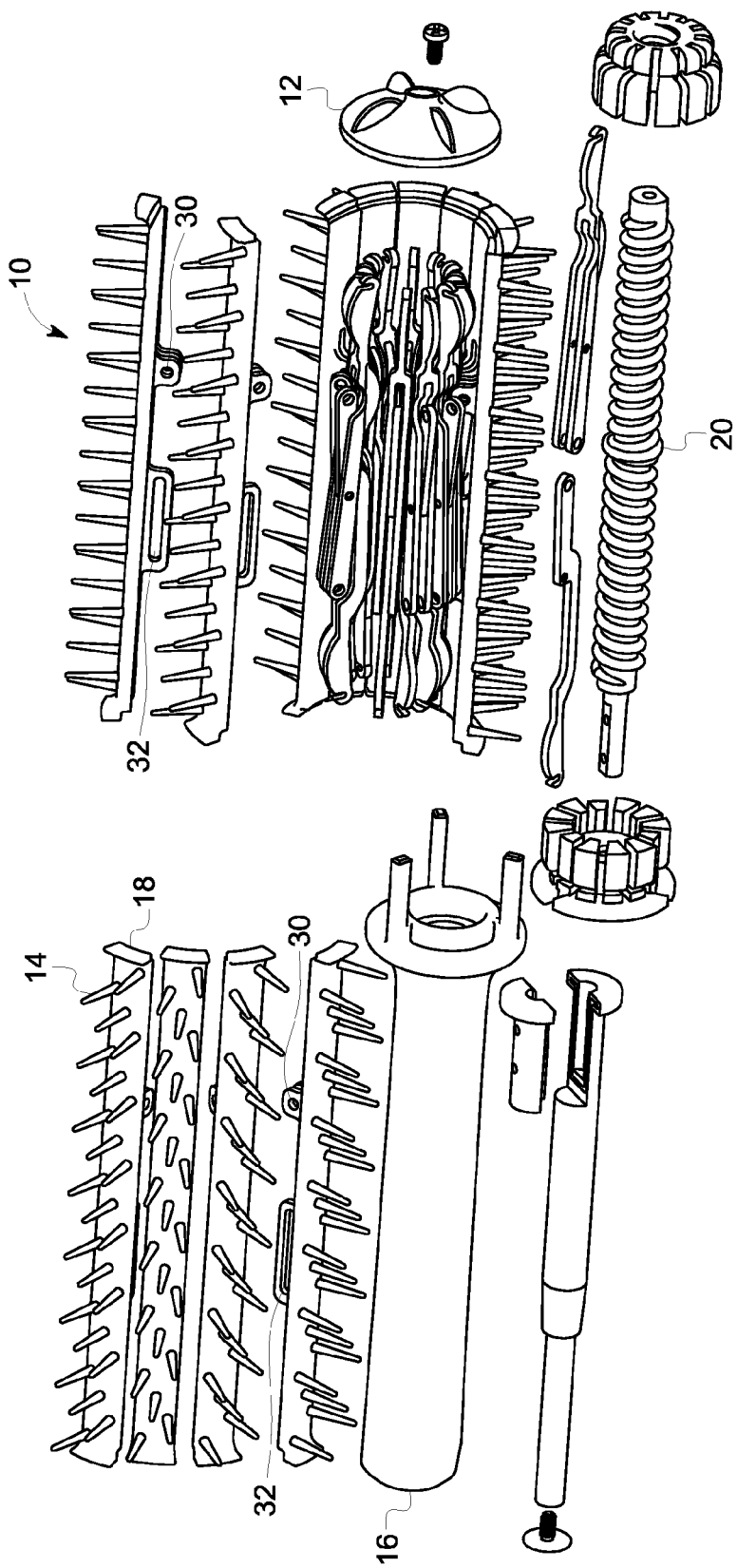
FIG. 6 is an exploded view of the embodiment of FIG. 1 illustrating the various parts thereof.

FIG. 6 is an exploded view of the embodiment of FIG. 1 illustrating the various parts thereof.

FIGS. 7A and 7B are front perspective views illustrating optional side flaps 36 in a fully extended position (7A) and a fully retracted position (7B). The flaps are implemented to close the gap between adjacent plates as the mechanism is extended. This assists in some embodiments in keeping the hair from tangling with the mechanism and in a heated hair brush version assists in directing heated airflow through holes placed in the plates rather than through gaps between adjacent plates. Springs 38 bias the flaps toward an open position useful in the extended position of the mechanism. As adjacent plates push on the flaps as they are moved toward the retracted position they are pushed closed against the biasing action of the springs 38.

Figure 8A:
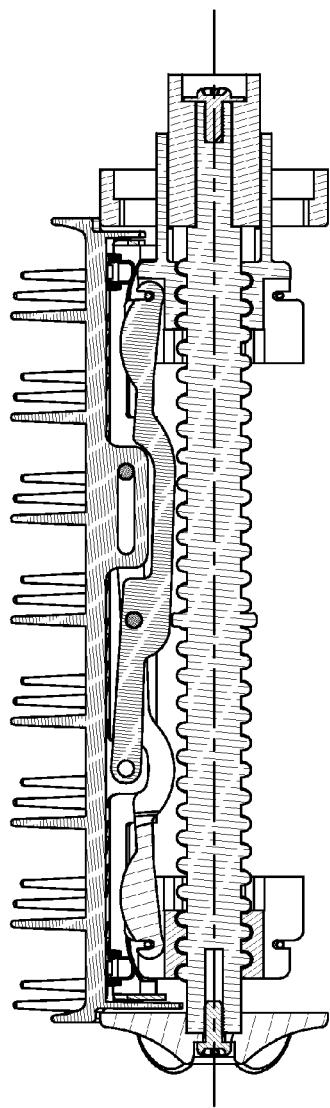
FIGS. 8A and 8B are side sectional views illustrating an embodiment of the present invention configured as an adjustable diameter hair brush with side flaps in a fully retracted position (8A) and a fully extended position (8B).
Figure 8B:
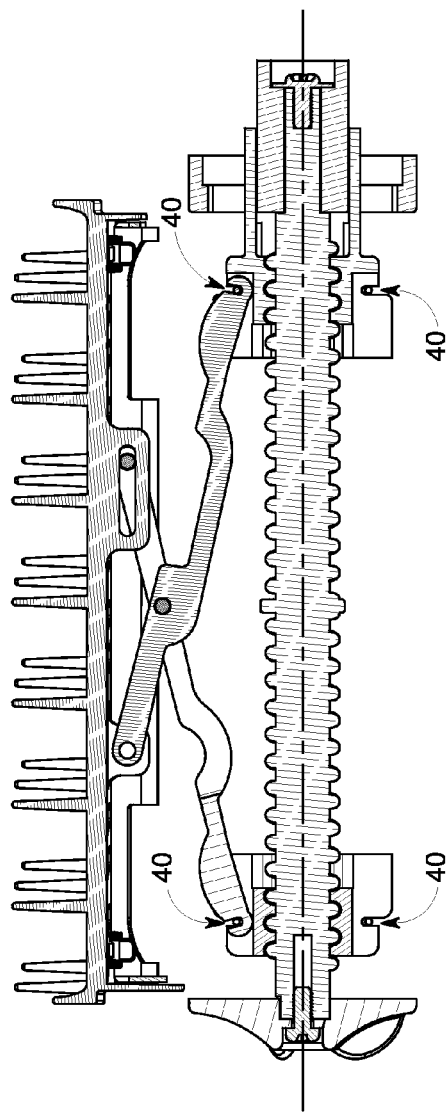

FIGS. 8A and 8B are side sectional views illustrating an embodiment of the present invention configured as an adjustable diameter hair brush with side flaps in a fully retracted position (8A) and a fully extended position (8B).

Figure 9C:
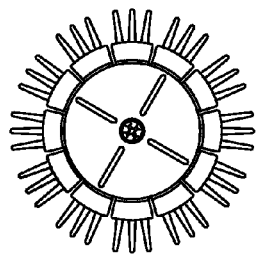
FIGS. 9A, 9B and 9C are, respectively, a side elevational view of an embodiment of the present invention configured as an adjustable diameter hair brush in the fully retracted position; a cutaway view thereof, and an end view thereof.
Figure 9A:
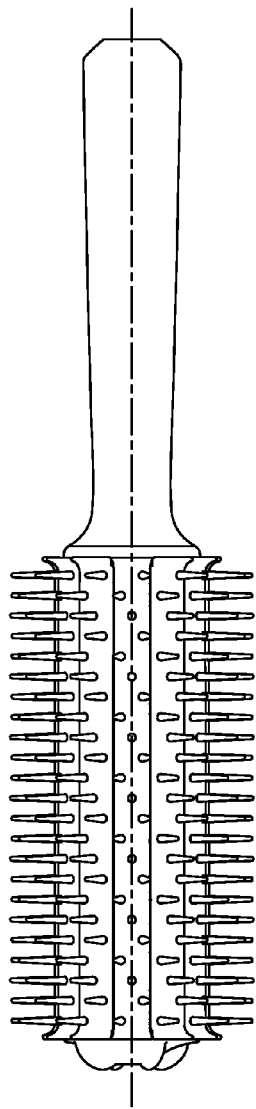
Figure 9B:
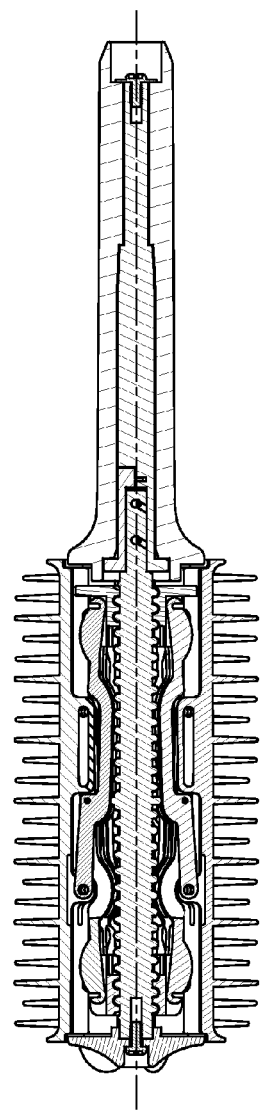

FIGS. 9A, 9B and 9C are, respectively, a side elevational view of an embodiment of the present invention configured as an adjustable diameter hair brush in the fully retracted position; a cutaway view thereof, and an end view thereof.

Figure 10:
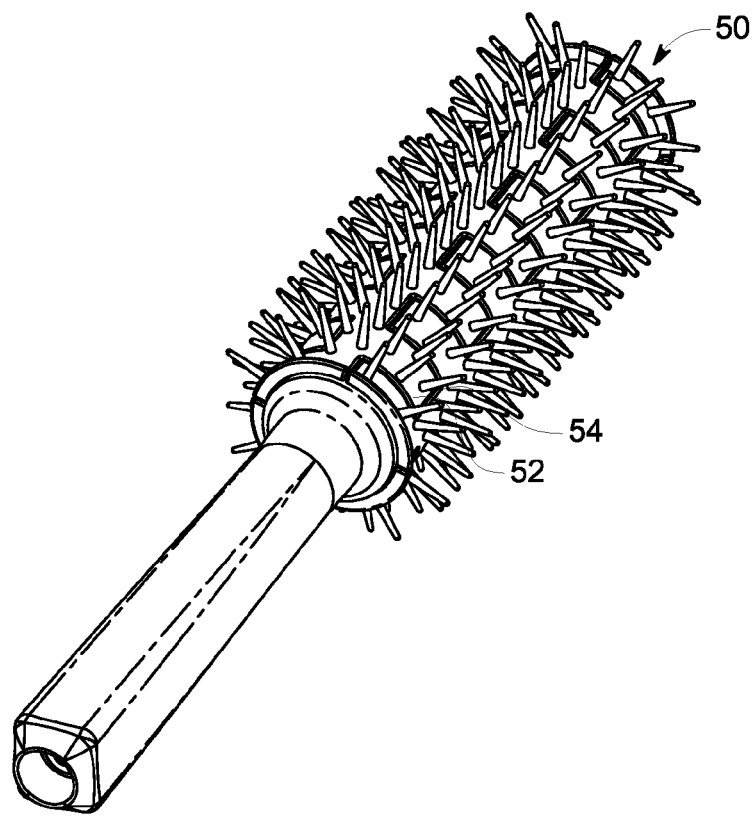
FIG. 10 is a front perspective view of one embodiment of the present invention configured as an adjustable diameter hair brush in the fully retracted position.

FIG. 10 is a front perspective view of one embodiment 50 of the present invention configured as an adjustable diameter hair brush in the fully retracted position. This embodiment includes overlapping fingers 52 which fit into or engage corresponding slots 54 to cover the gap between adjacent plates.

Figure 11:
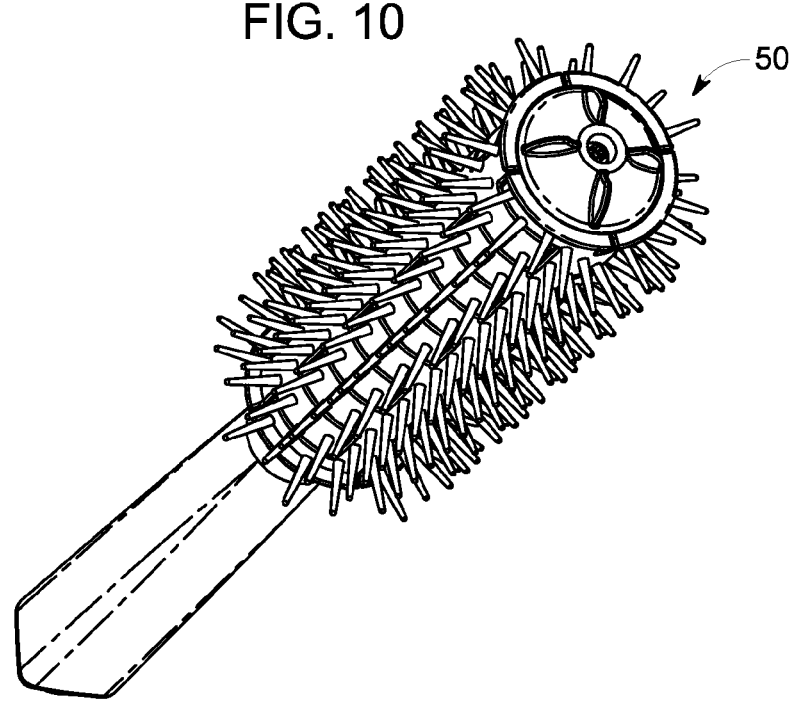
FIG. 11 is a rear perspective view of the embodiment of FIG. 10 in the fully retracted position.

FIG. 11 is a rear perspective view of the embodiment of FIG. 10 in the fully retracted position.

Figure 12:
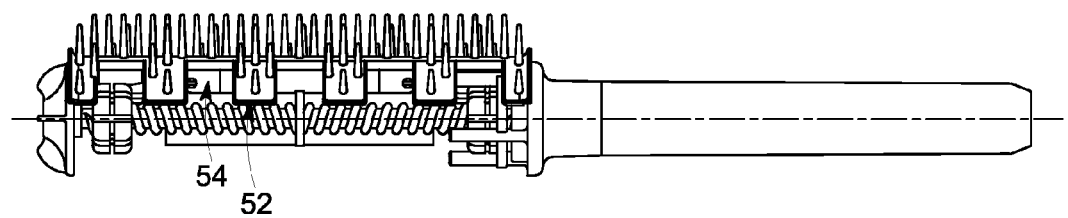
FIG. 12 is a side elevational view of the embodiment of FIG. 10 with a single plate installed and in the fully retracted position.

FIG. 12 is a side elevational view of the embodiment of FIG. 10 with a single plate installed and in the fully retracted position.

Figure 13:
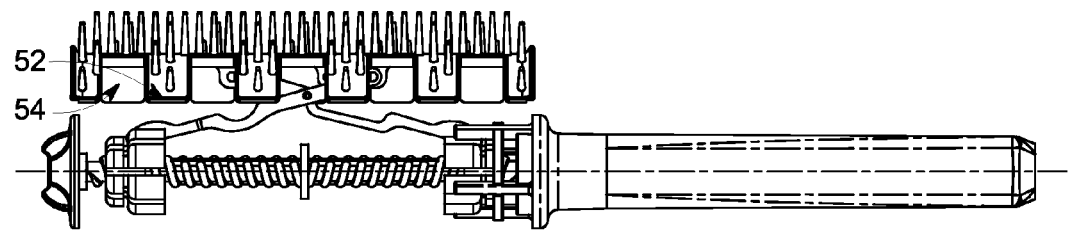
FIG. 13 is a side elevational view of the embodiment of FIG. 10 with a single plate installed and in the fully extended position.

FIG. 13 is a side elevational view of the embodiment of FIG. 10 with a single plate installed and in the fully extended position.

Figure 14:
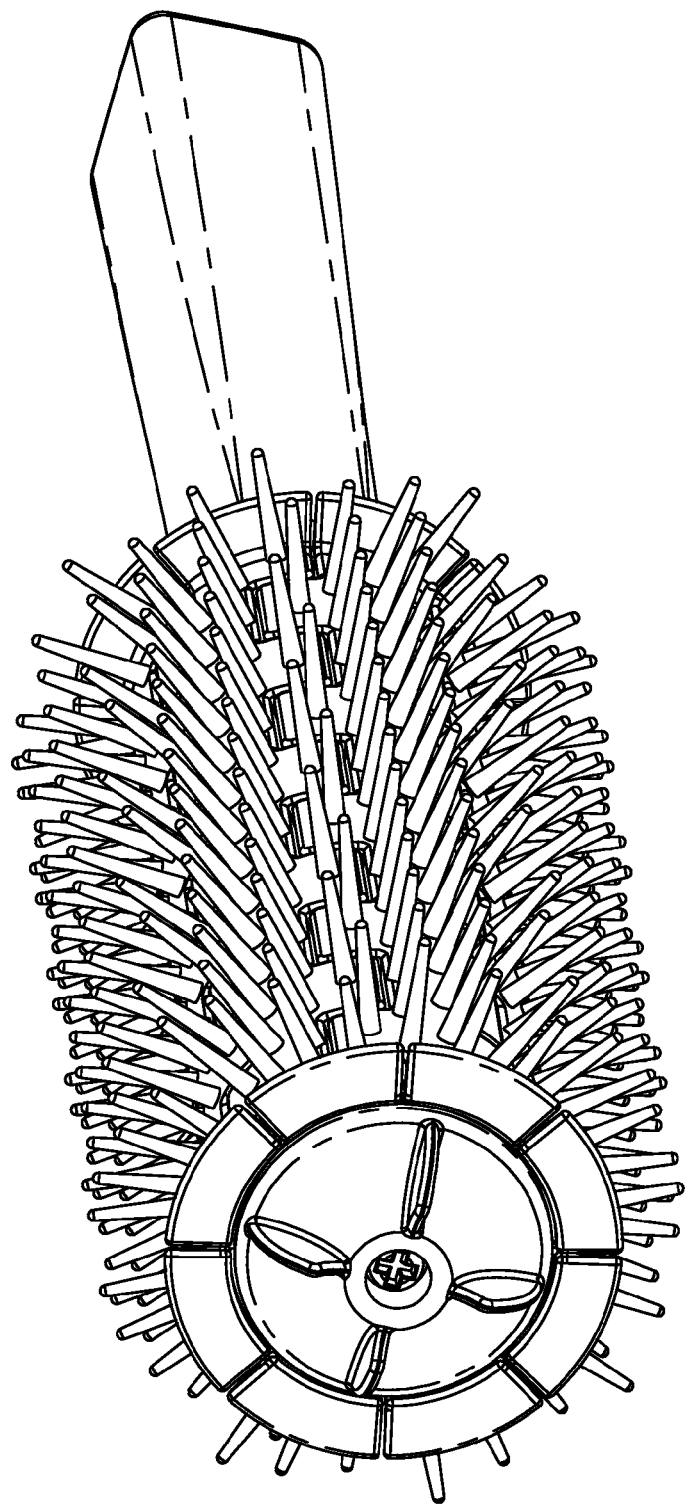
FIG. 14 is a front perspective view of one embodiment of the present invention configured as an adjustable diameter hair brush in the fully retracted position.

FIG. 14 is a front perspective view of one embodiment of the present invention configured as an adjustable diameter hair brush in the fully retracted position.

Figure 15:
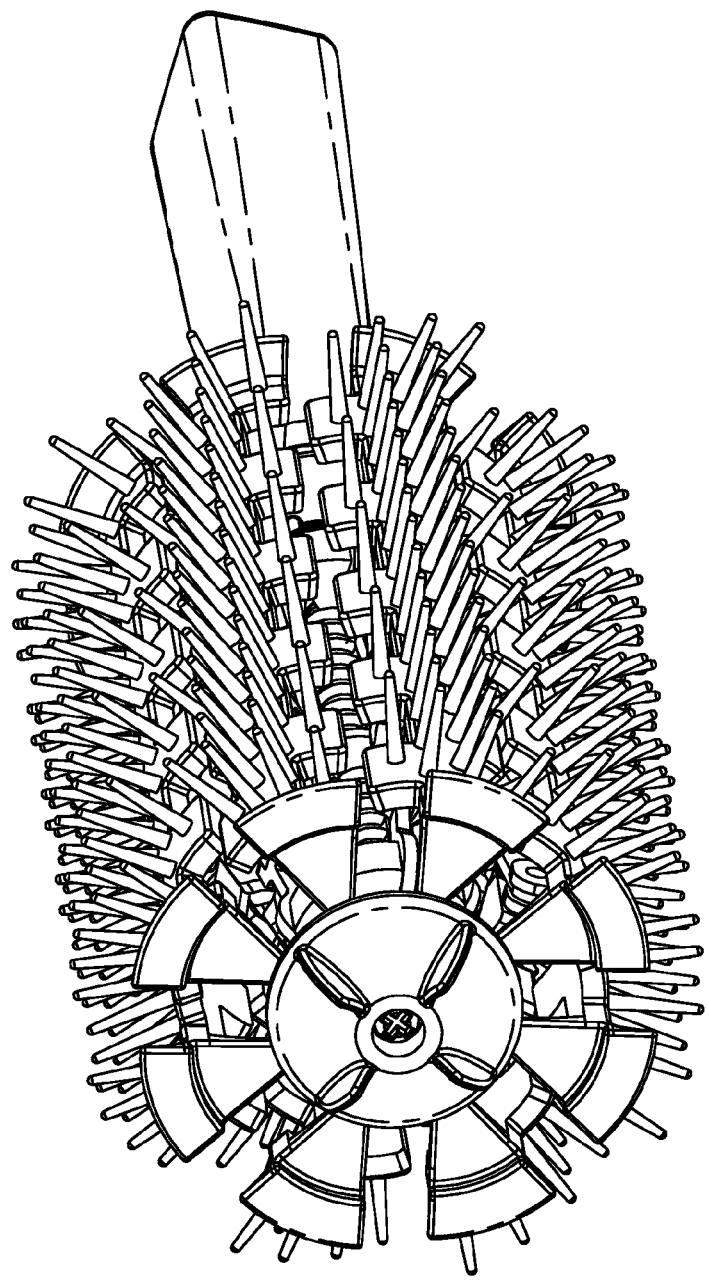
FIG. 15 is a front perspective view of the embodiment of FIG. 14 in the fully extended position.

FIG. 15 is a front perspective view of the embodiment of FIG. 14 in the fully extended position.

Figure 16:
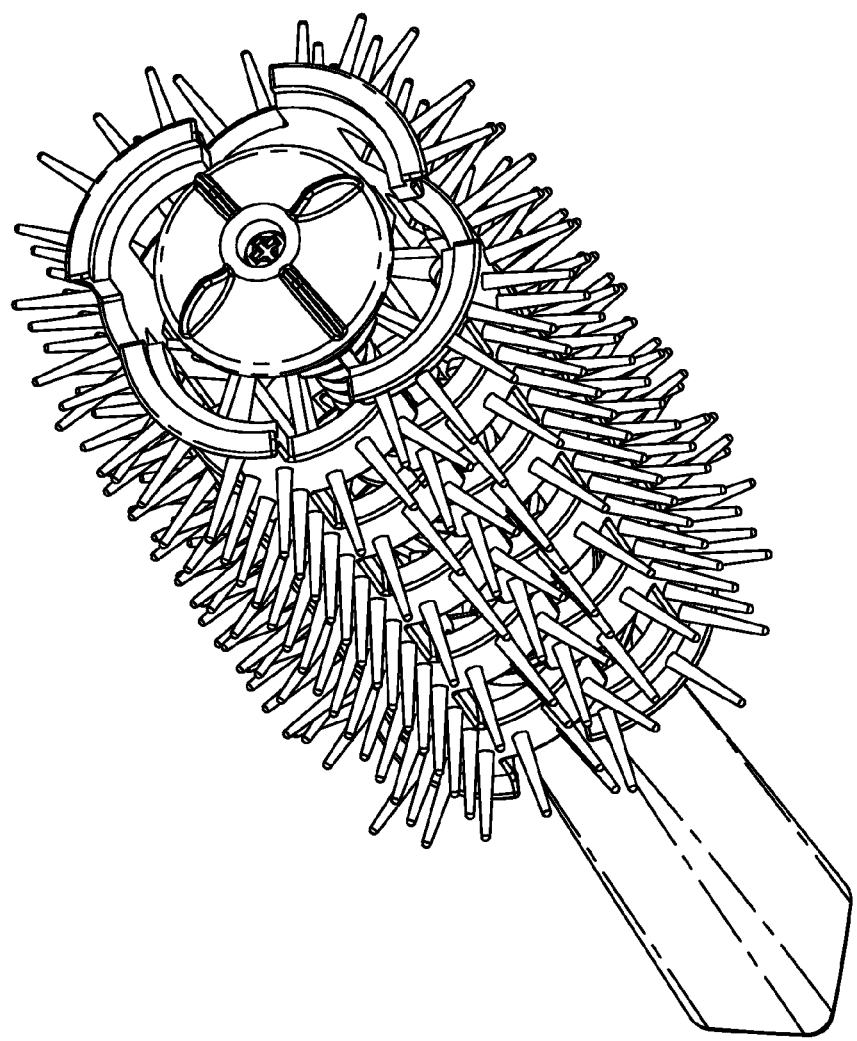
FIG. 16 is a front perspective view of one embodiment of the present invention configured as an adjustable diameter hair brush in a fully extended position.

FIG. 16 is a front perspective view of one embodiment of the present invention configured as an adjustable diameter hair brush in a fully extended position.

Figure 17A:
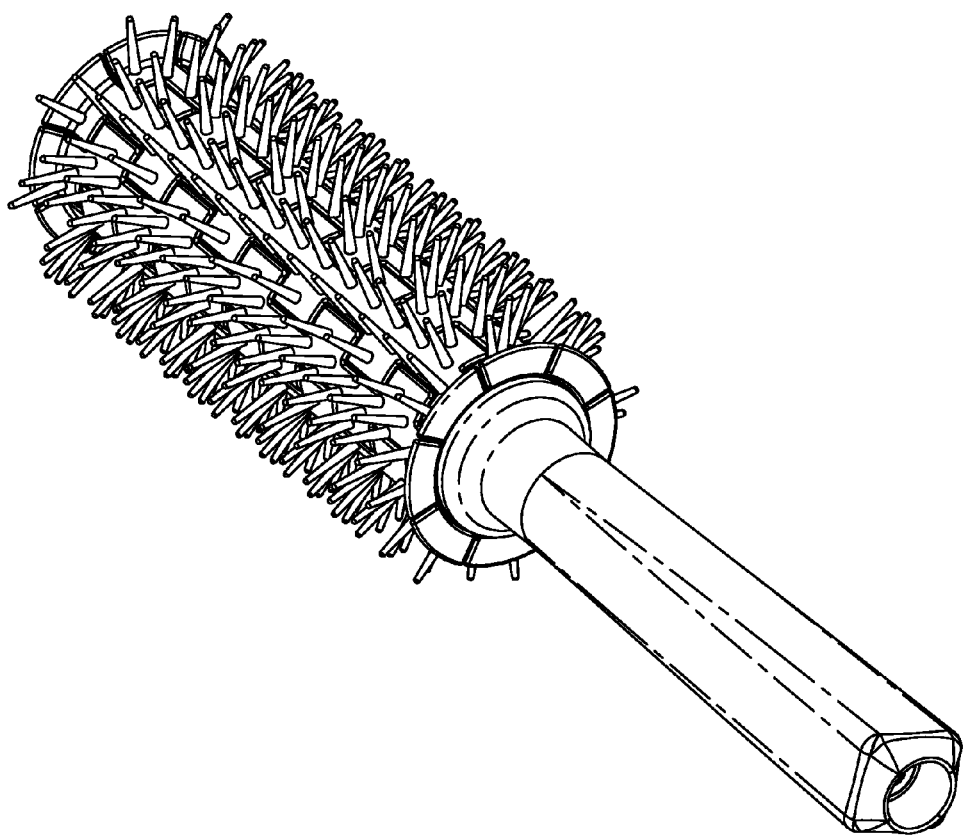
FIG. 17A is a rear perspective view of one embodiment of the present invention configured as an adjustable diameter hair brush in the fully retracted position.

FIG. 17A is a rear perspective view of one embodiment of the present invention configured as an adjustable diameter hair brush in the fully retracted position.

Figure 17B:
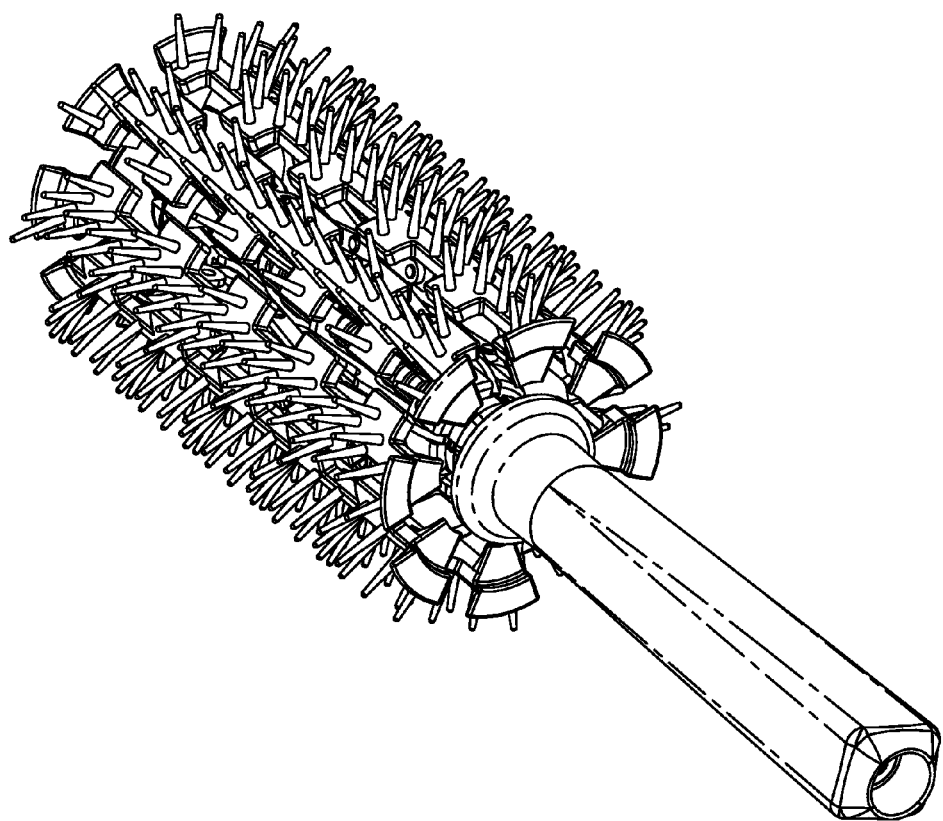
FIG. 17B is a rear perspective view of the embodiment of FIG. 17A in the fully extended position.

FIG. 17B is a rear perspective view of the embodiment of FIG. 17A in the fully extended position.

Figure 18:
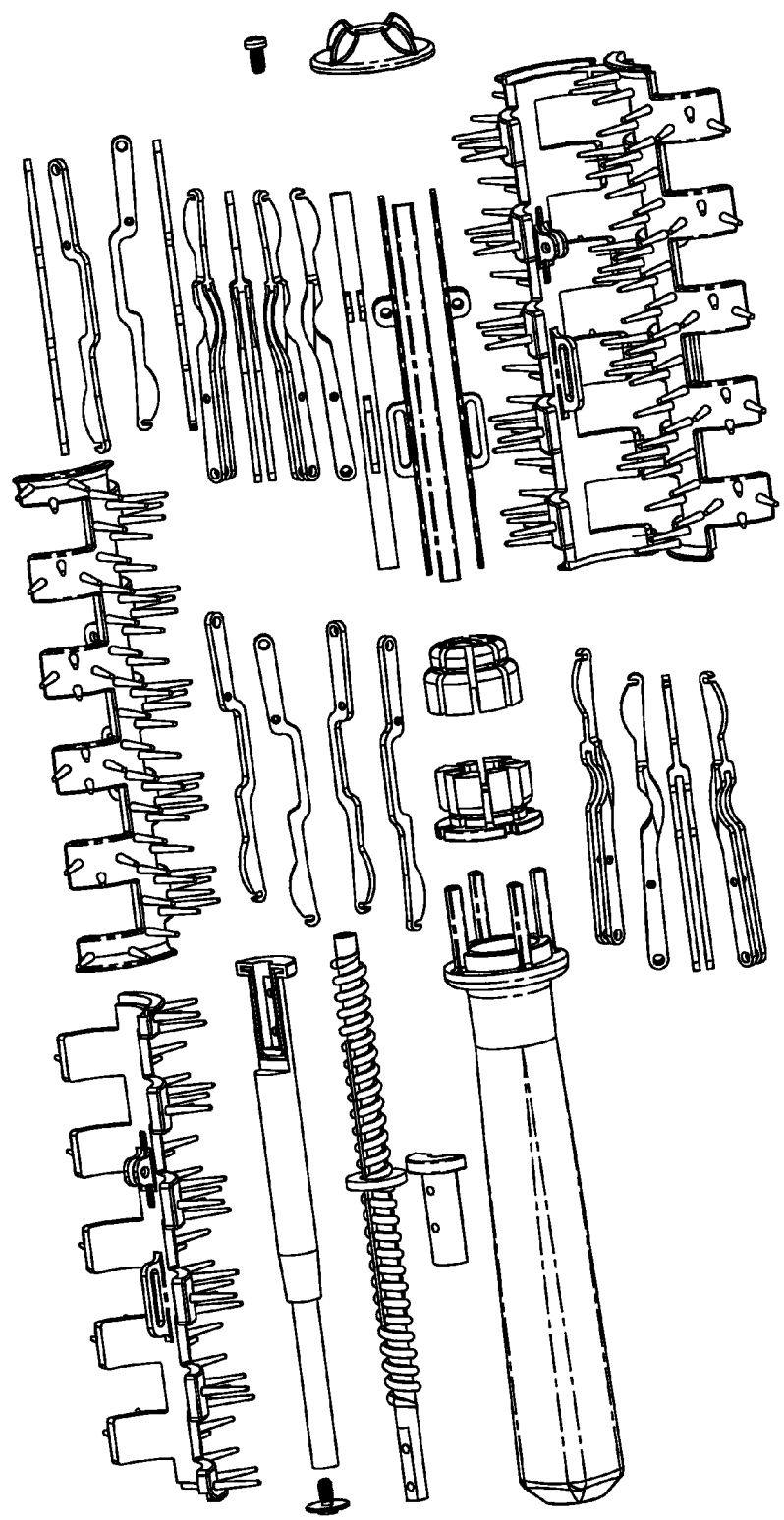
FIG. 18 is an exploded view of the embodiment of FIG. 16 illustrating the various parts thereof.

FIG. 18 is an exploded view of the embodiment of FIG. 16 illustrating the various parts thereof.

Figure 19C:
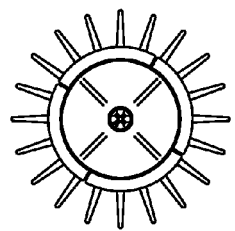
FIGS. 19A, 19B and 19C are, respectively, a side elevational view of an embodiment of the present invention as depicted in FIG. 16 configured as an adjustable diameter hair brush in the fully retracted position; a cutaway view thereof, and an end view thereof.
Figure 19A:
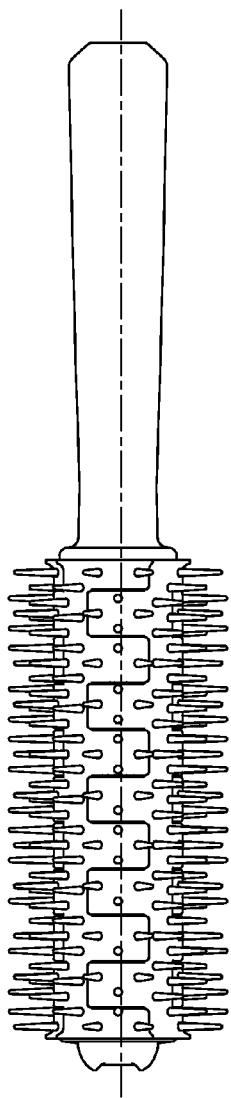
Figure 19B:
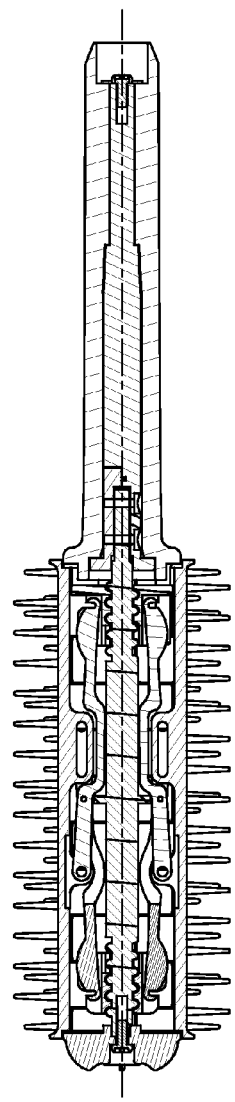

FIGS. 19A, 19B and 19C are, respectively, a side elevational view of an embodiment of the present invention as depicted in FIG. 16 configured as an adjustable diameter hair brush in the fully retracted position; a cutaway view thereof, and an end view thereof.

Figure 20:
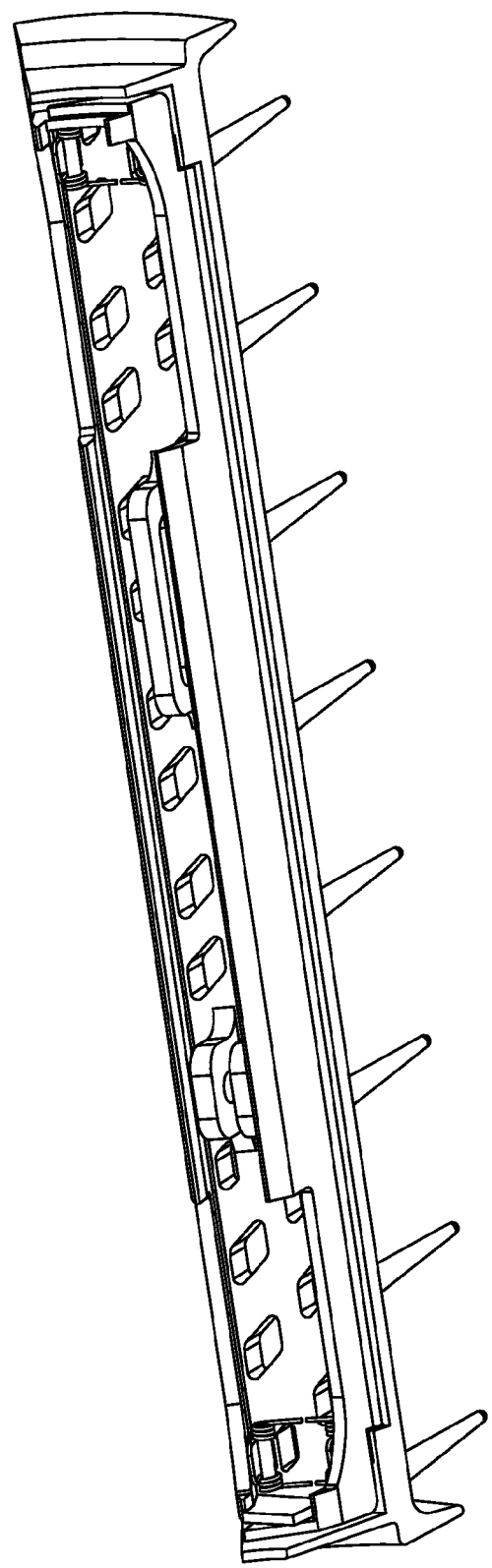
FIG. 20 is a front perspective view of a brush plate element in accordance with one embodiment of the present invention in a collapsed configuration as it would be if the brush were fully retracted.

FIG. 20 is a front perspective view of a brush plate element in accordance with one embodiment of the present invention in a collapsed configuration as it would be if the brush were fully retracted.

Figure 21:
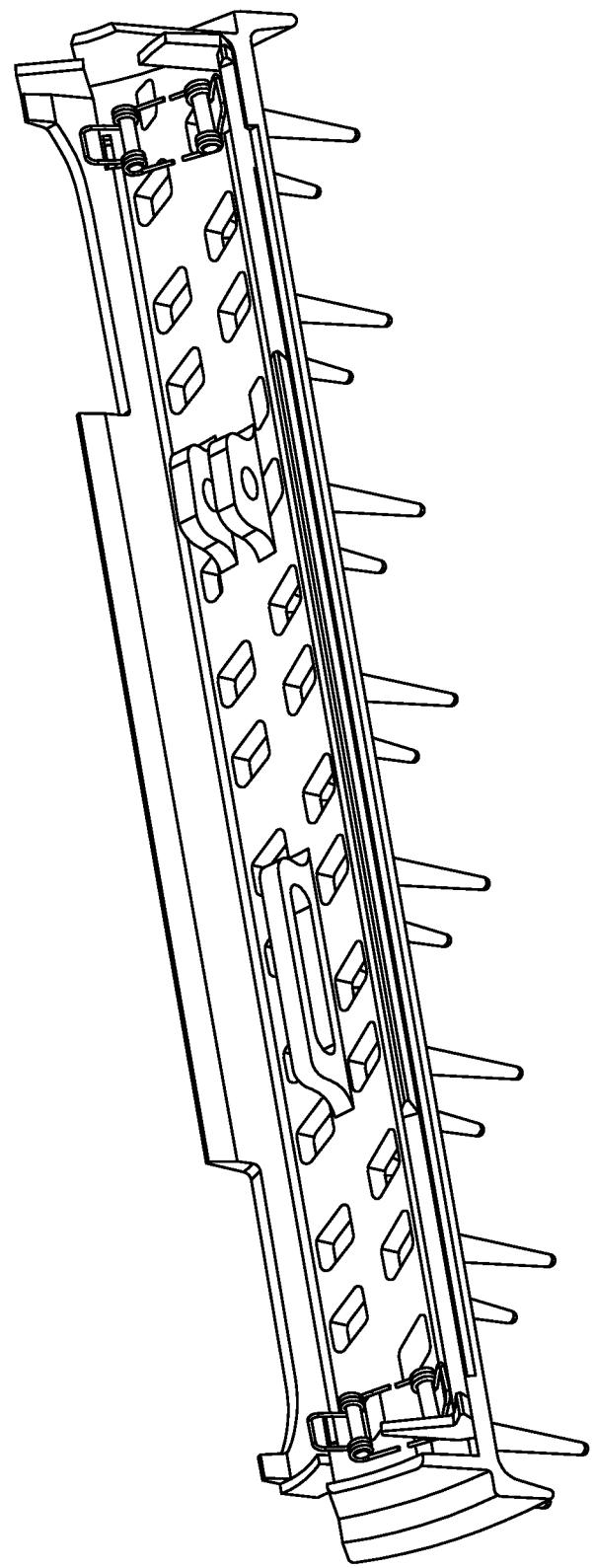
FIG. 21 is a front perspective view of a brush plate element in accordance with one embodiment of the present invention in an extended configuration as it would be if the brush were fully extended.

FIG. 21 is a front perspective view of a brush plate element in accordance with one embodiment of the present invention in an extended configuration as it would be if the brush were fully extended.

Figure 22:
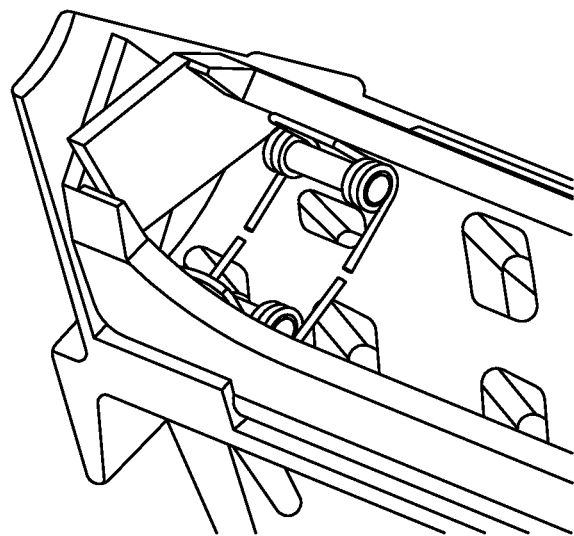
FIG. 22 is an expanded view detailing the configuration of the biasing springs used to bias the brush plate flaps into an extended position when the brush plate element is in a collapsed configuration as it would be if the brush were fully retracted.

FIG. 22 is an expanded view detailing the configuration of the biasing springs used to bias the brush plate flaps into an extended position when the brush plate element is in a collapsed configuration as it would be if the brush were fully retracted.

Figure 23:
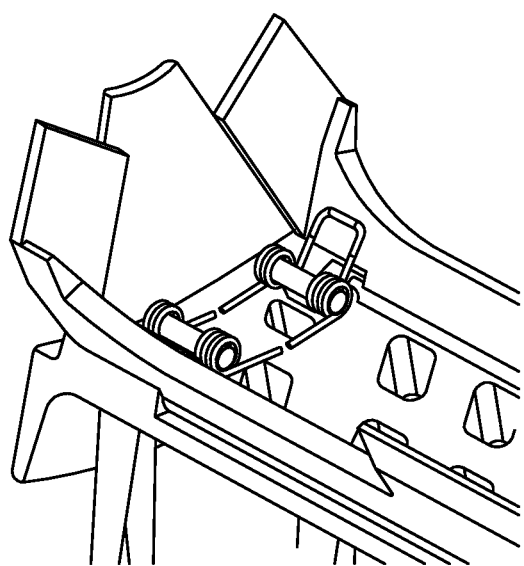
FIG. 23 is an expanded view detailing the configuration of the biasing springs used to bias the brush plate flaps into an extended position when the brush plate element is in an extended configuration as it would be if the brush were fully extended.

FIG. 23 is an expanded view detailing the configuration of the biasing springs used to bias the brush plate flaps into an extended position when the brush plate element is in an extended configuration as it would be if the brush were fully extended.

Figure 24A:
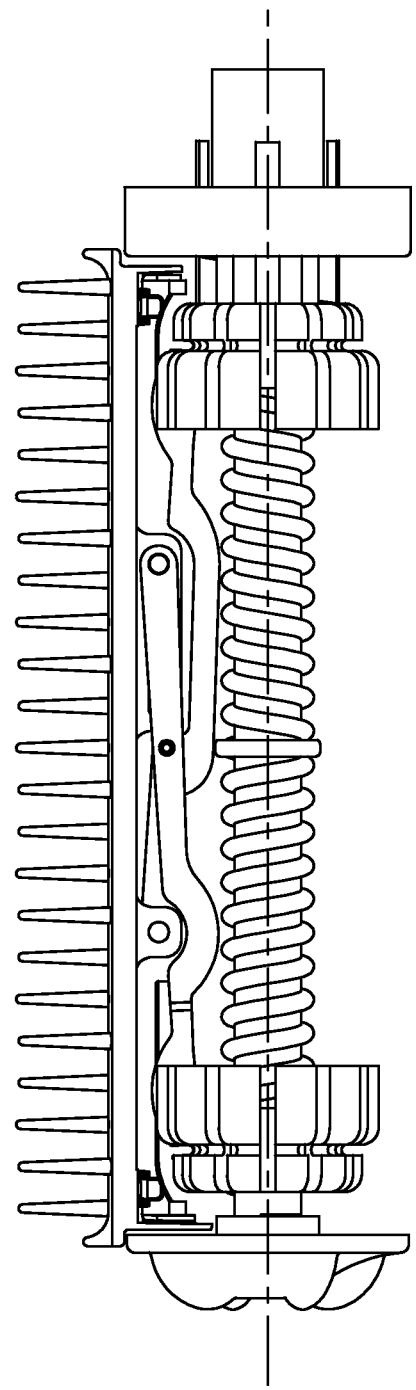
FIGS. 24A and 24B are, respectively, side elevational views of one embodiment of the present invention configured as an adjustable diameter hair brush with a single plate installed and in a (FIG. 24A) fully retracted position, and in a (FIG. 24B) fully extended position.
Figure 24B:
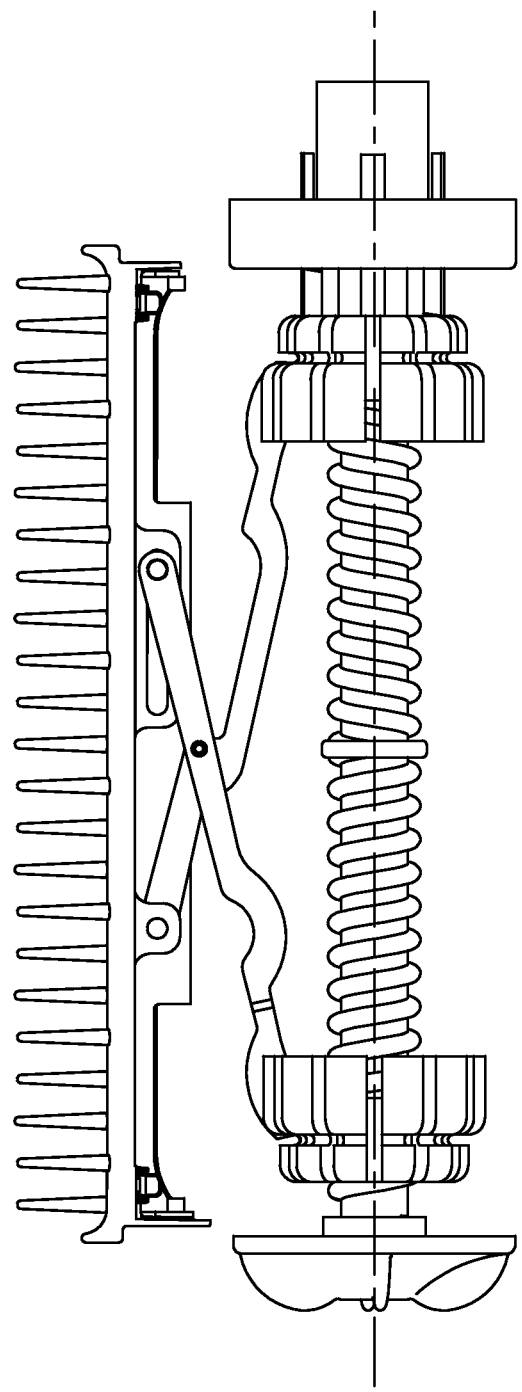

FIGS. 24A and 24B are, respectively, side elevational views of one embodiment of the present invention configured as an adjustable diameter hair brush with a single plate installed and in a (FIG. 24A) fully retracted position, and in a (FIG. 24B) fully extended position.

Figure 25:
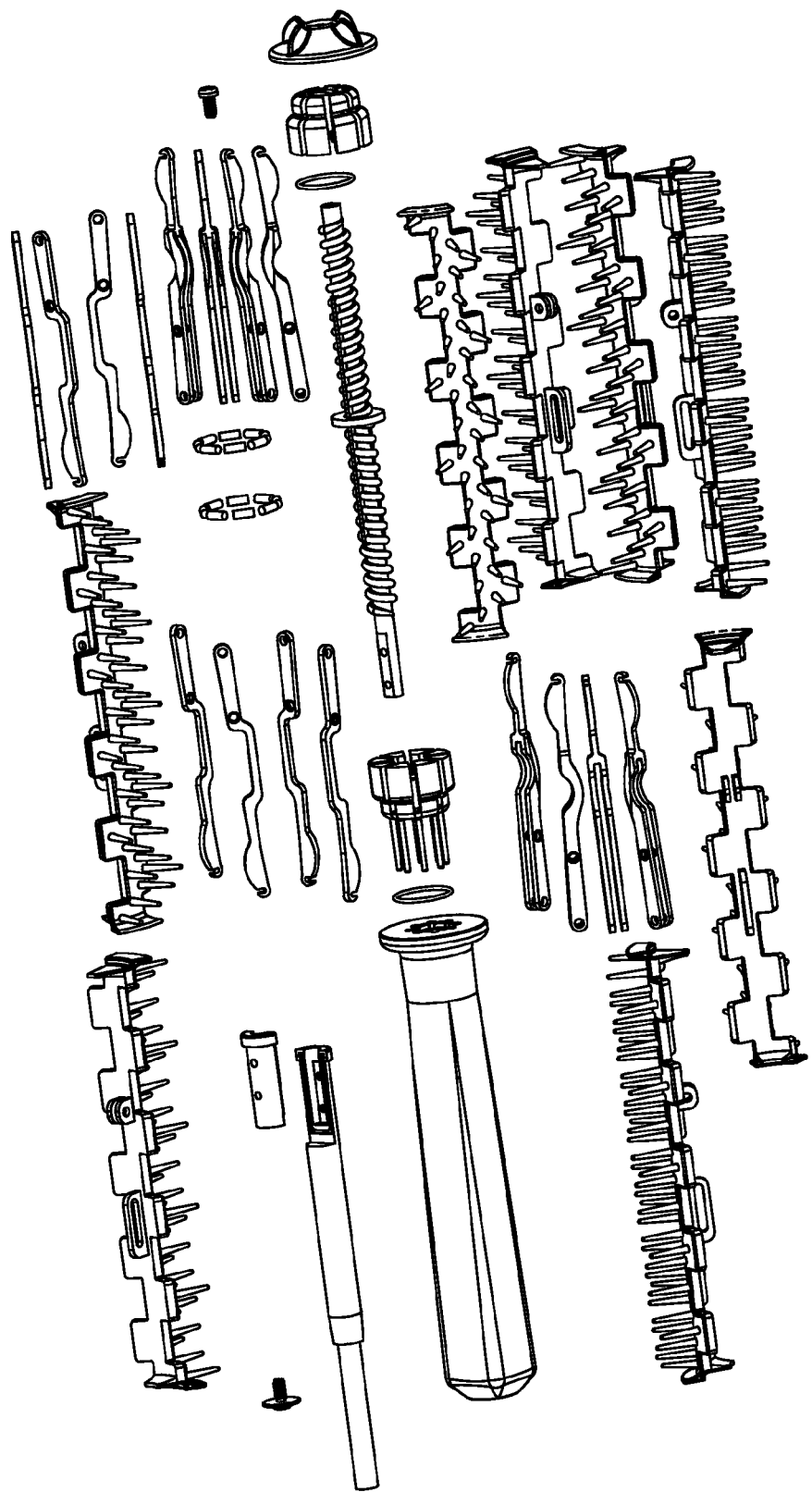
FIG. 25 is an exploded view illustrating the parts used in one embodiment of the present invention configured as an adjustable diameter hair brush.

FIG. 25 is an exploded view illustrating the parts used in one embodiment of the present invention configured as an adjustable diameter hair brush.

Figure 26:
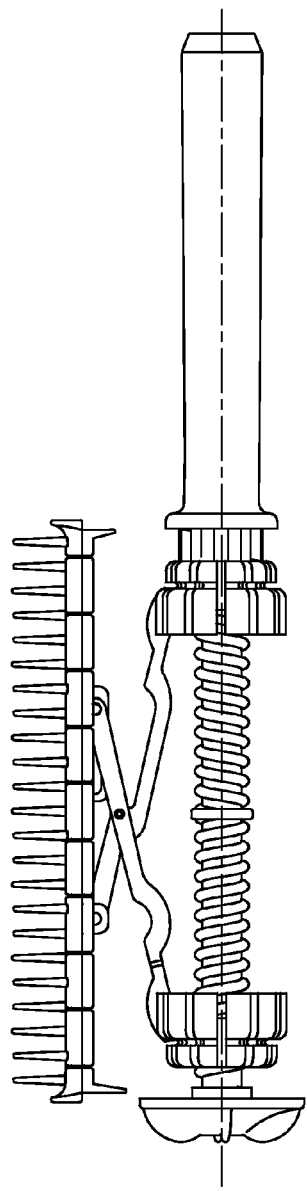
FIG. 26 is a side elevational view of the embodiment of FIG. 25 illustrating the brush in the fully extended position with a single brush plate shown for clarity.

FIG. 26 is a side elevational view of the embodiment of FIG. 25 illustrating the brush in the fully extended position with a single brush plate shown for clarity.

Figure 27:
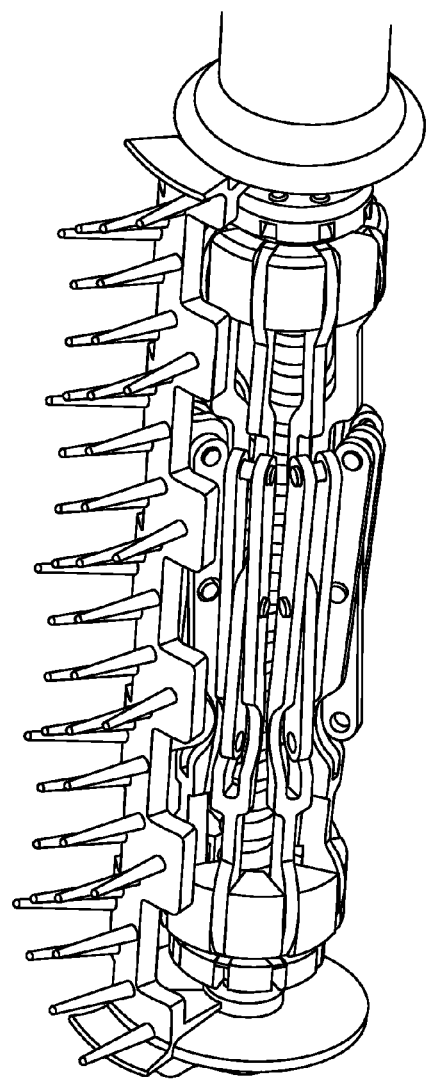
FIG. 27 is a front perspective cut-away view of the embodiment of FIG. 25 illustrating the brush and its internal components in the fully retracted position.

FIG. 27 is a front perspective cut-away view of the embodiment of FIG. 25 illustrating the brush and its internal components in the fully retracted position.

Figure 28:
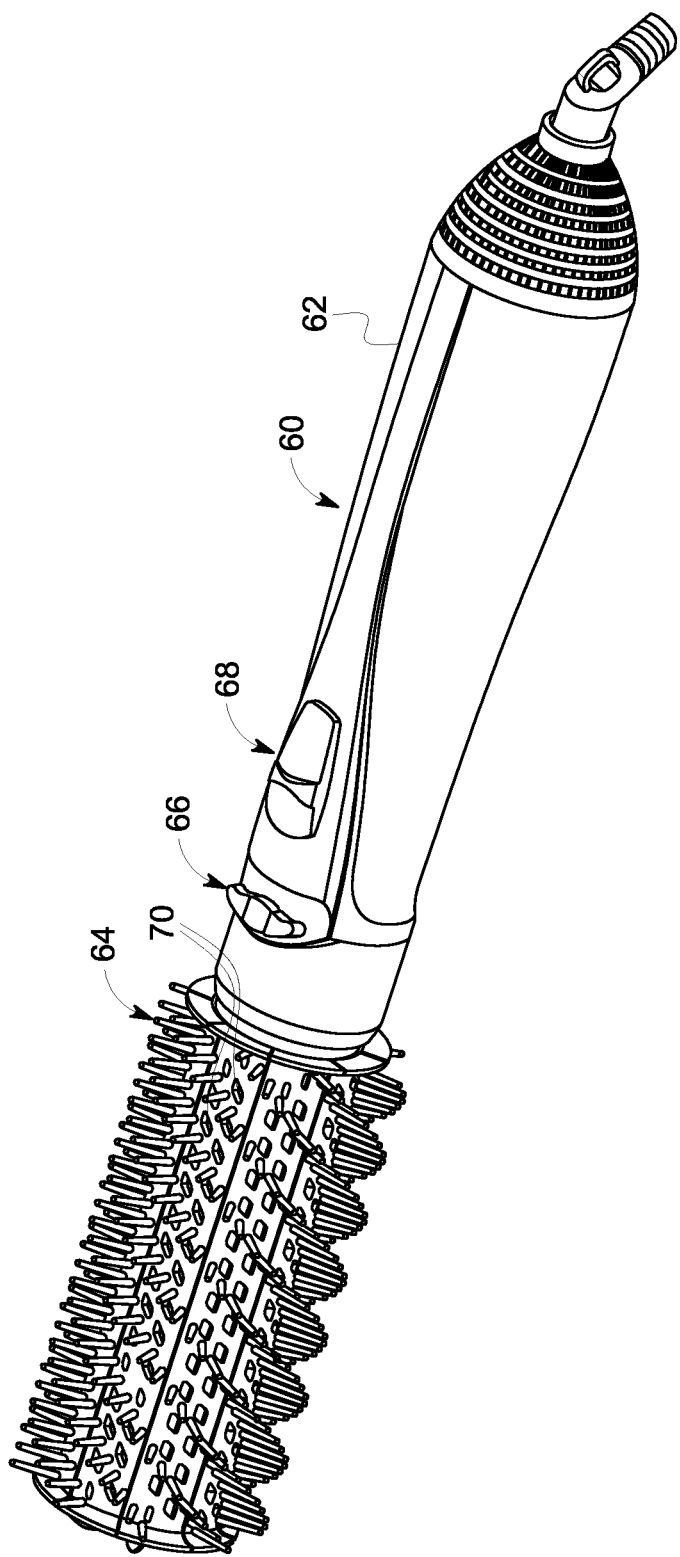
FIG. 28 is a rear perspective view of one embodiment of the present invention configured as an adjustable diameter rotating heated hairbrush showing the adjustable diameter hairbrush component in a fully retracted configuration.

FIG. 28 is a rear perspective view of one embodiment of the present invention configured as an adjustable diameter rotating heated hairbrush 60 showing the adjustable diameter hairbrush component in a fully retracted configuration. A motor (not shown) within handle 62 drives hair brush assembly 64 in a rotary fashion. Rotary direction controls 66 are provided. An air temperature adjustment control 68 is provided. Air is heated within handle 62 by a conventional air heater and ejected out apertures 70 in hair brush assembly 64.

Figure 29:
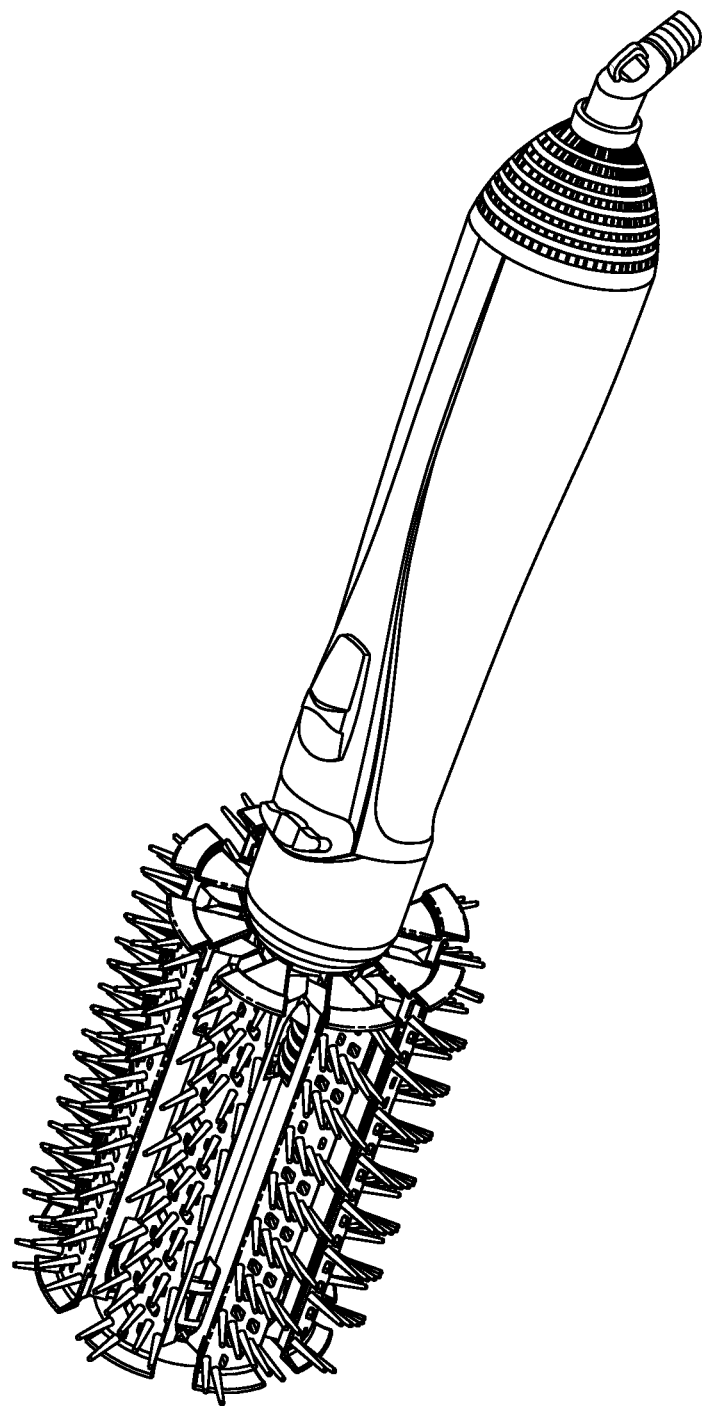
FIG. 29 is a rear perspective view of the embodiment of FIG. 28 showing the adjustable diameter hairbrush component in a fully extended configuration.

FIG. 29 is a rear perspective view of the embodiment of FIG. 28 showing the adjustable diameter hairbrush component in a fully extended configuration.

Figure 30A:
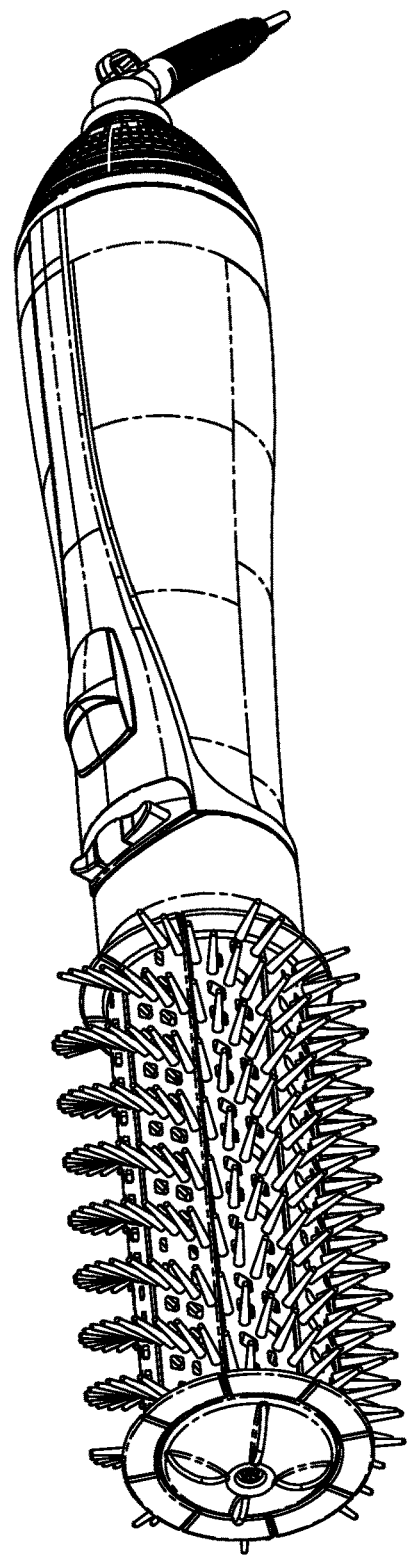
FIGS. 30A and 30B are front perspective views of the embodiment of FIG. 28 illustrating the hairbrush component in a fully retracted configuration.
Figure 30B:
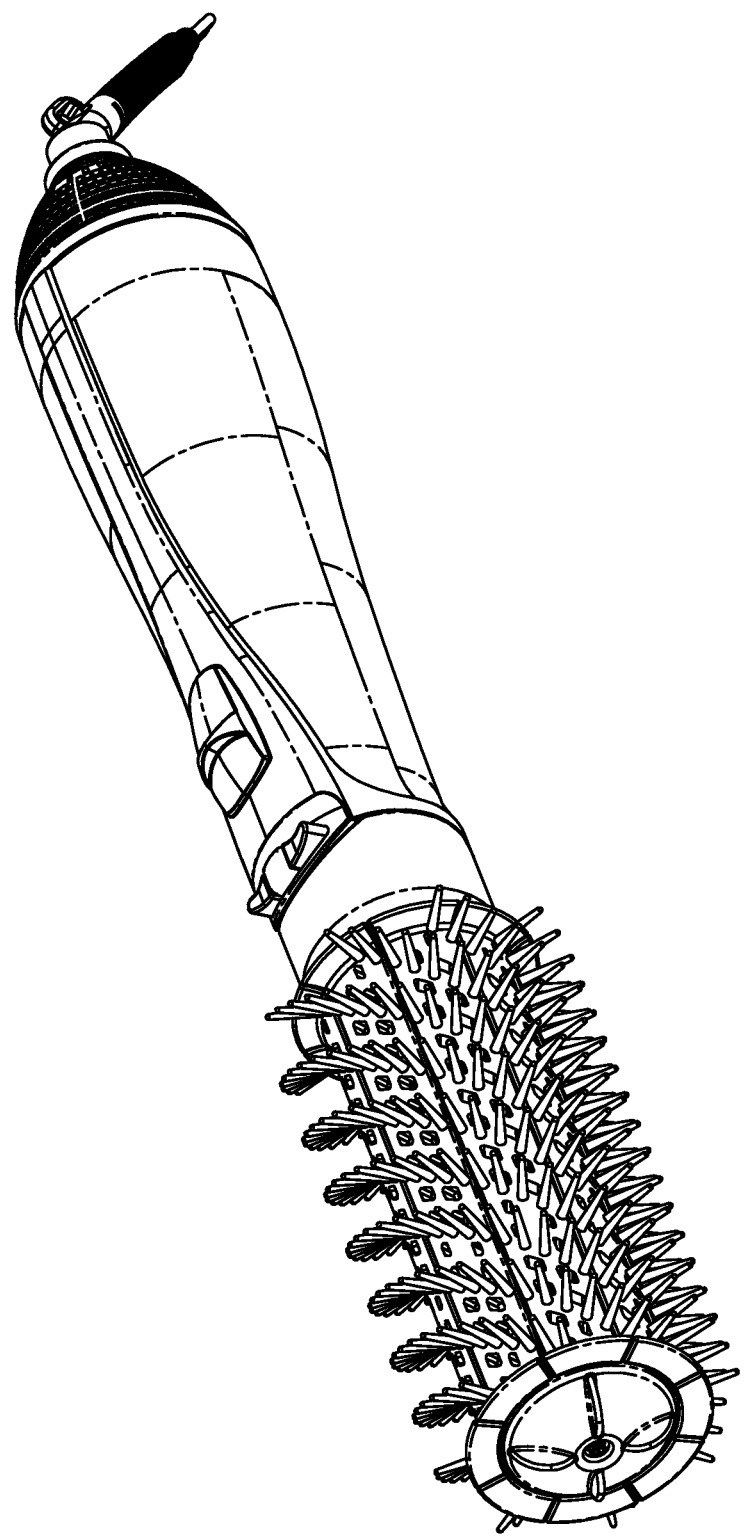

FIGS. 30A and 30B are front perspective views of the embodiment of FIG. 28 illustrating the hairbrush component in a fully retracted configuration.

Figure 31B:
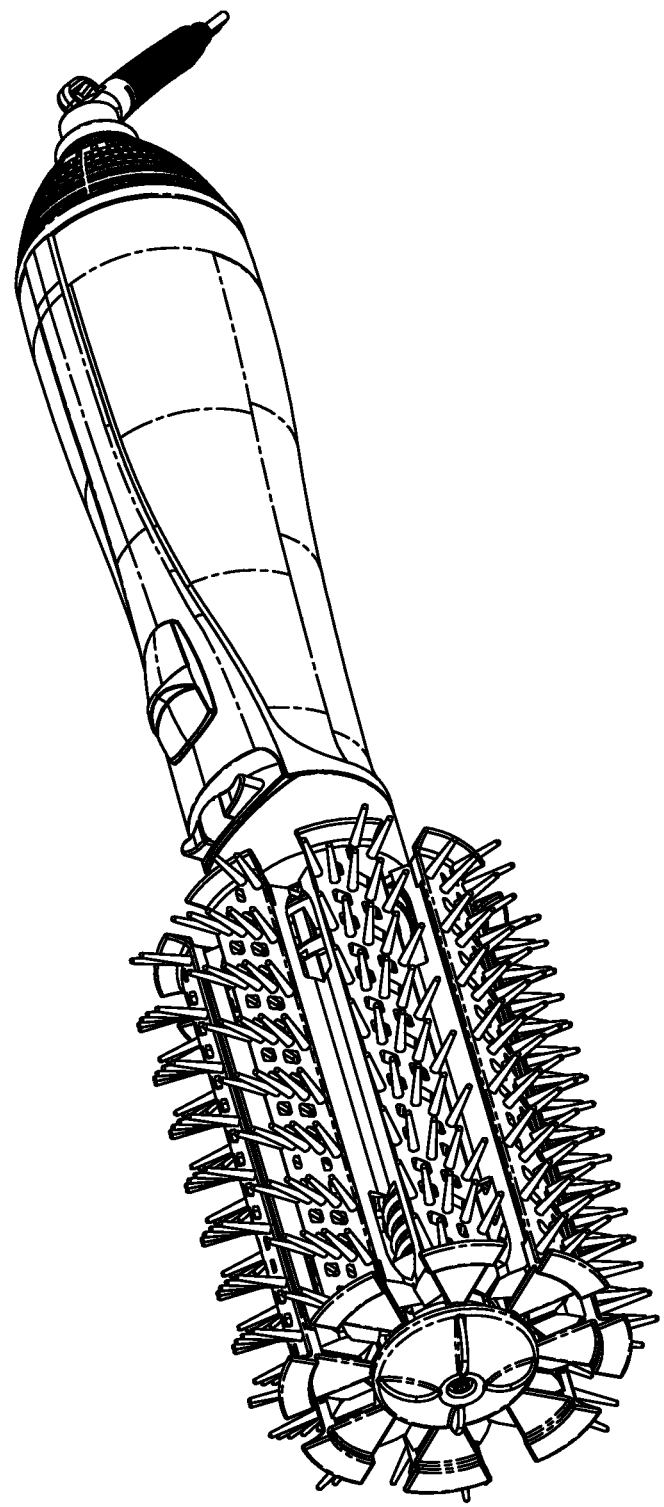

FIGS. 31A and 31B are front perspective views of the embodiment of FIG. 28 illustrating the hairbrush component in a fully extended configuration.

Figure 32A:
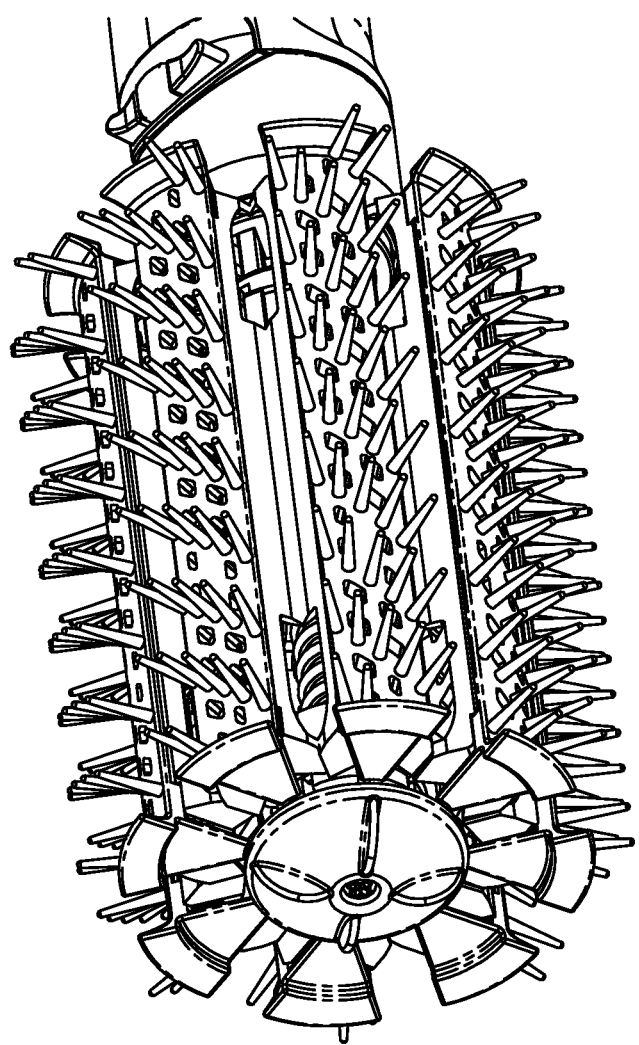
FIGS. 32A and 32B are front perspective views illustrating the hairbrush component detail of the embodiment of FIG. 28 where the side plates extended to block heated airflow so that it primarily flows through holes in the hairbrush plates rather than gaps between the plates.
Figure 32B:
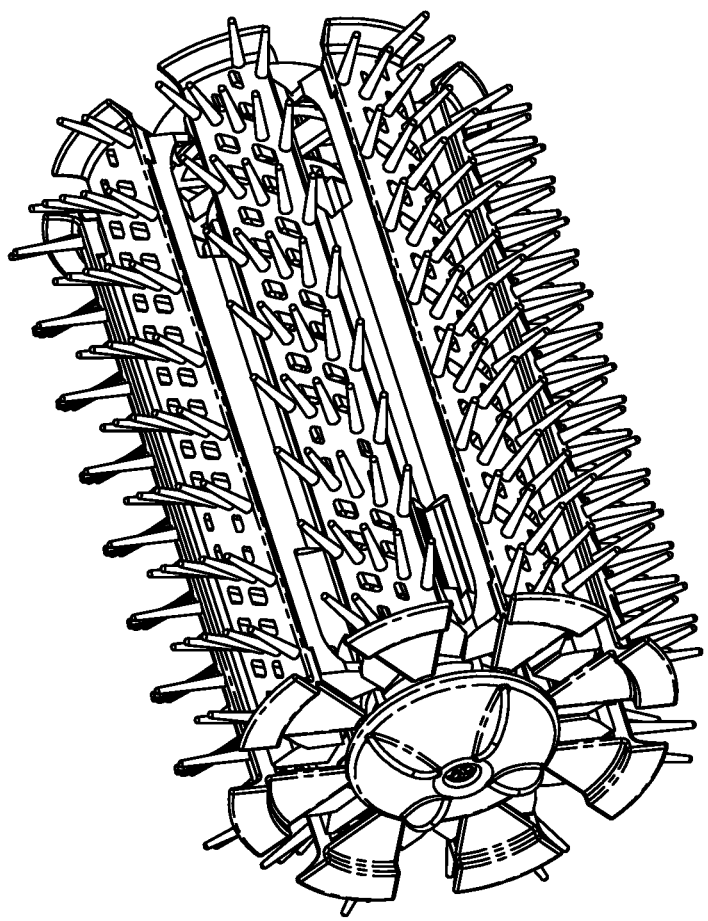

FIGS. 32A and 32B are front perspective views illustrating the hairbrush component detail of the embodiment of FIG. 28 where the side plates extended to block heated airflow so that it primarily flows through holes in the hairbrush plates rather than gaps between the plates.

Figure 33A:
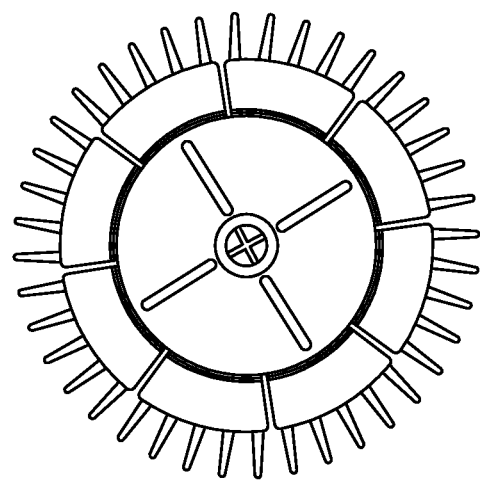
FIG. 33A is an end view of the embodiment of FIG. 28 illustrating the hairbrush component in a fully retracted configuration.

FIG. 33A is an end view of the embodiment of FIG. 28 illustrating the hairbrush component in a fully retracted configuration.

Figure 33B:
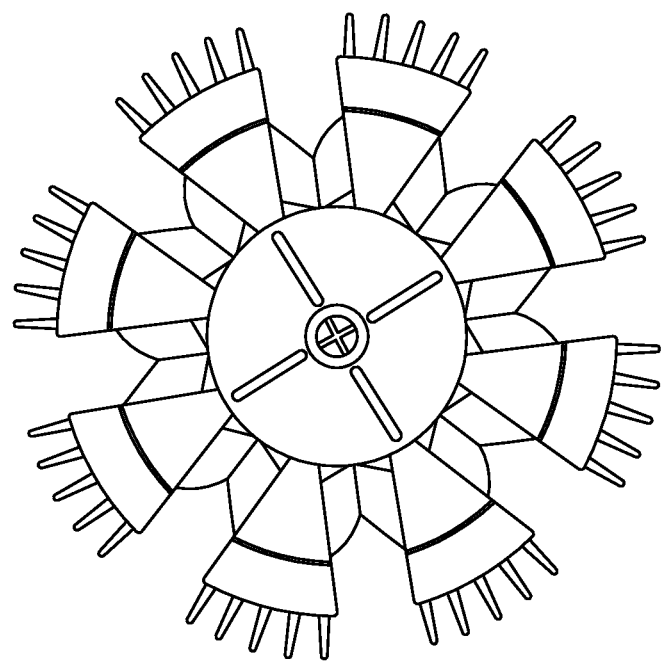
FIG. 33B is an end view of the embodiment of FIG. 28 illustrating the hairbrush component in a fully extended configuration.

FIG. 33B is an end view of the embodiment of FIG. 28 illustrating the hairbrush component in a fully extended configuration.

Figure 34:
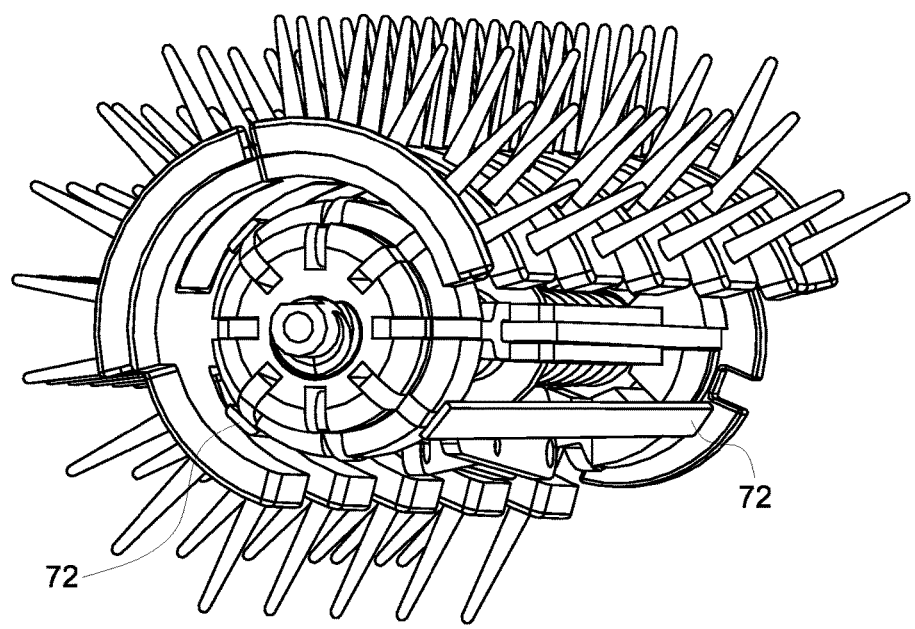
FIG. 34 is a front perspective partially cut-away view of an embodiment of the present invention including stiffening bars to provide additional longitudinal stability to the brush plates.

FIG. 34 is a front perspective partially cut-away view of an embodiment of the present invention including stiffening bars 72 to provide additional longitudinal stability to the brush plates.

Figure 35:
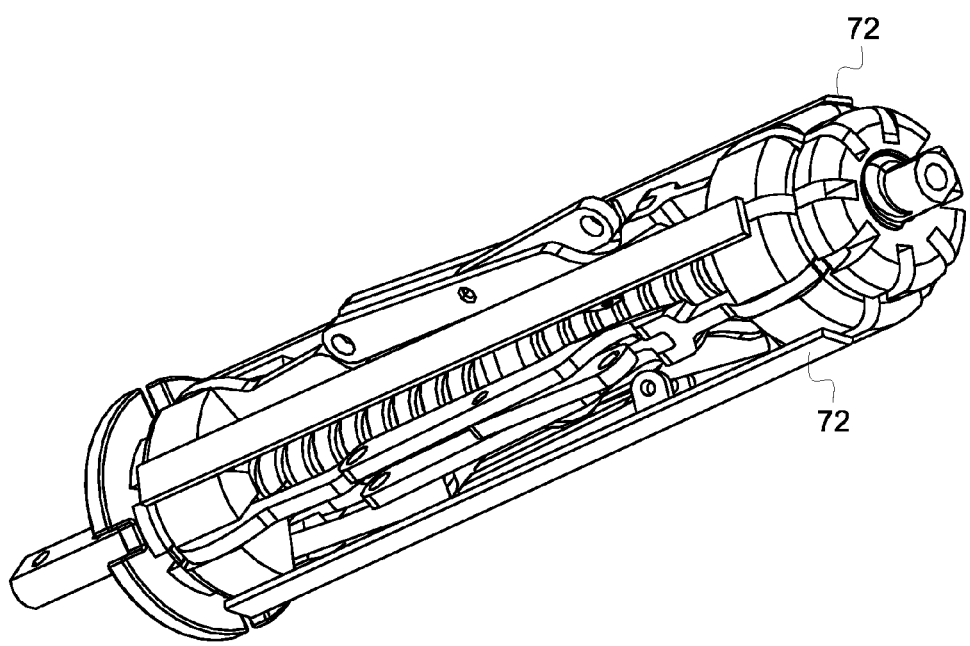
FIG. 35 is a front perspective partially cut-away view of an embodiment of the present invention including stiffening bars to provide additional longitudinal stability to the brush plates.

FIG. 35 is a front perspective partially cut-away view of an embodiment of the present invention including stiffening bars to provide additional longitudinal stability to the brush plates.

Figure 36:
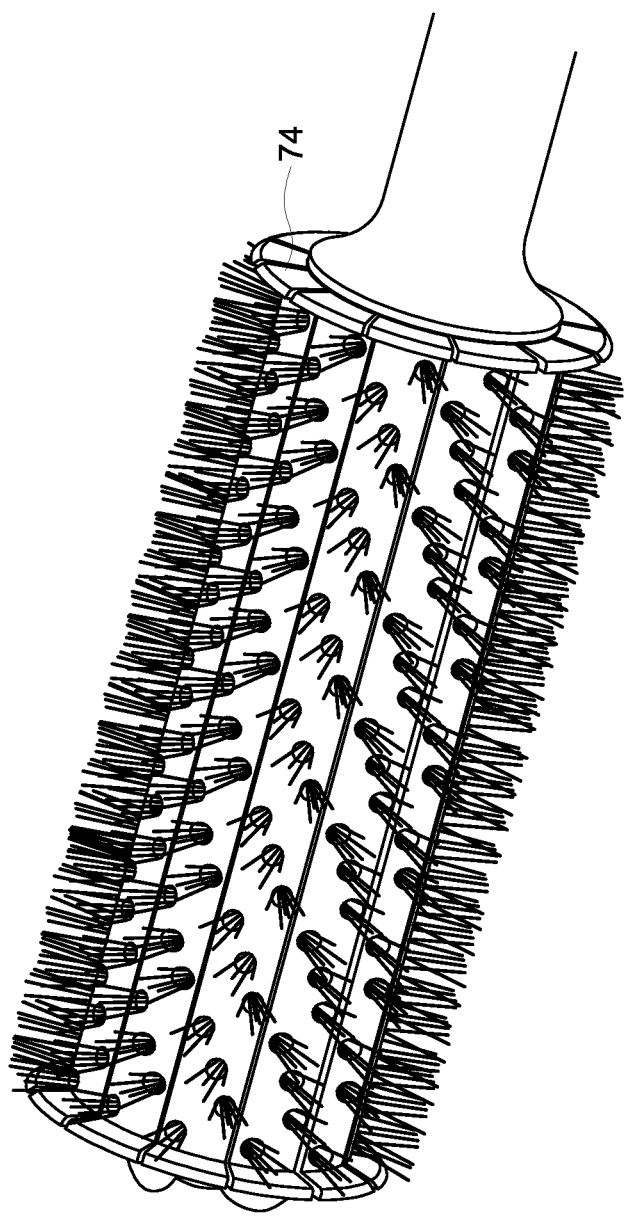
FIG. 36 is a front perspective illustration showing an embodiment of the present invention with metal covers over the bristle plates.

FIG. 36 is a front perspective illustration showing an embodiment of the present invention with metal covers over the bristle plates 74.

Figure 37:
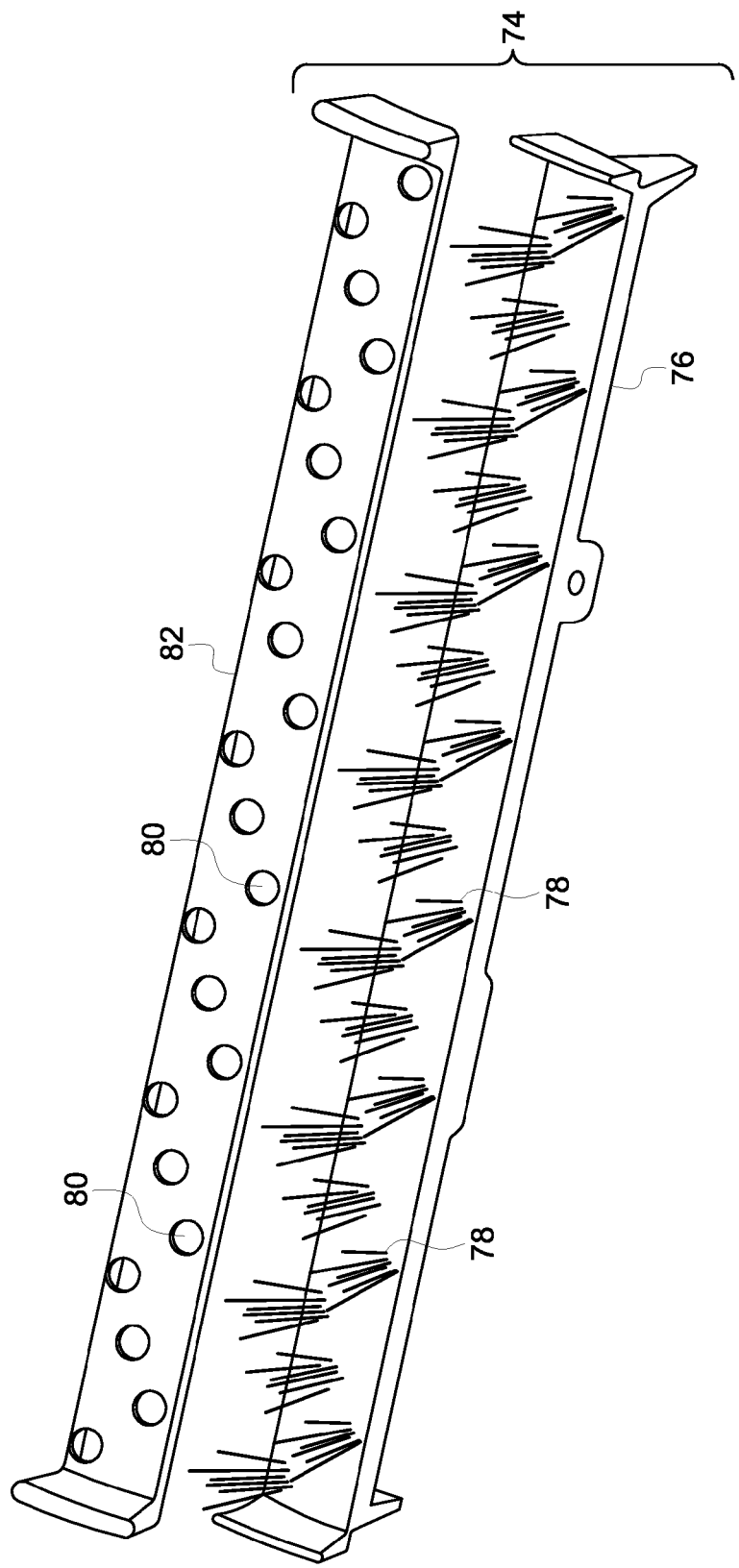
FIG. 37 is front perspective exploded view of a single bristle plate in accordance with the embodiment of FIG. 36.

FIG. 37 is front perspective exploded view of a single bristle plate 74 in accordance with the embodiment of FIG. 36. A plastic bristle attachment plate 76 includes a plurality of bristle attachment points 78 which align with holes 80 in metal cover 82. The metal covers may be formed of aluminum or any other suitable metal and left natural or painted or plated or coated with any suitable material to achieve a desired design effect.

Figure 38:
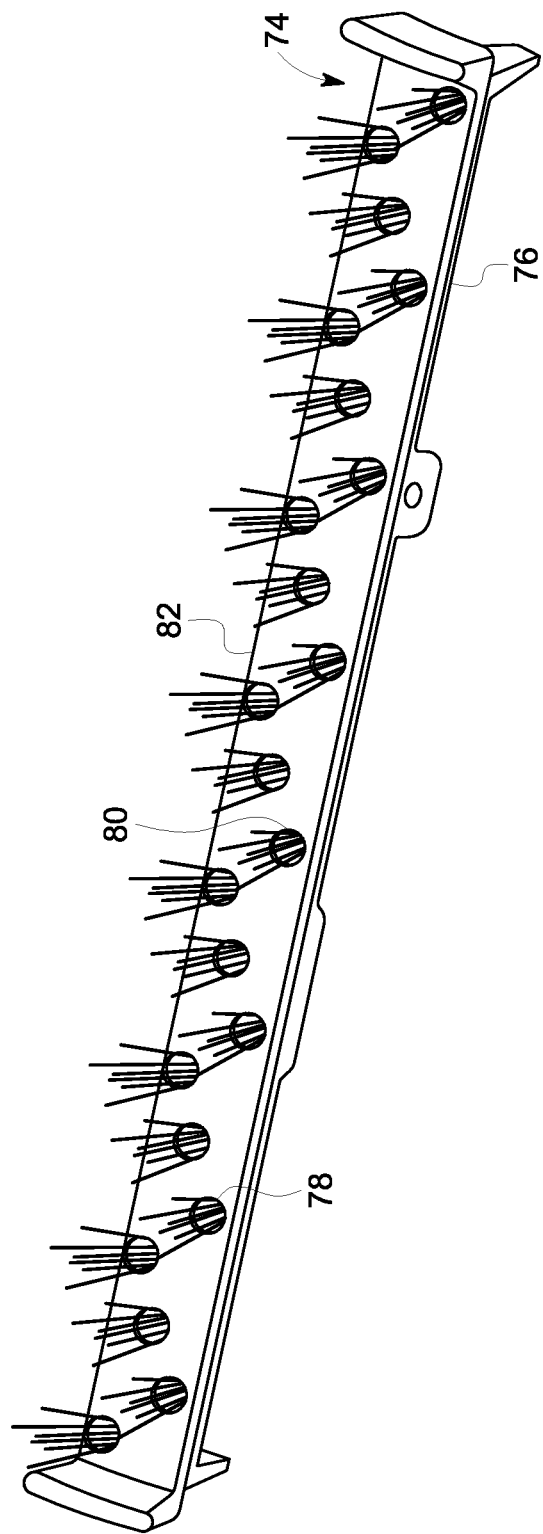
FIG. 38 is a front perspective view of a single bristle plate assembly in accordance with the embodiment of FIG. 36.

FIG. 38 is a front perspective view of a single bristle plate assembly in accordance with the embodiment of FIG. 36.

Figure 39:
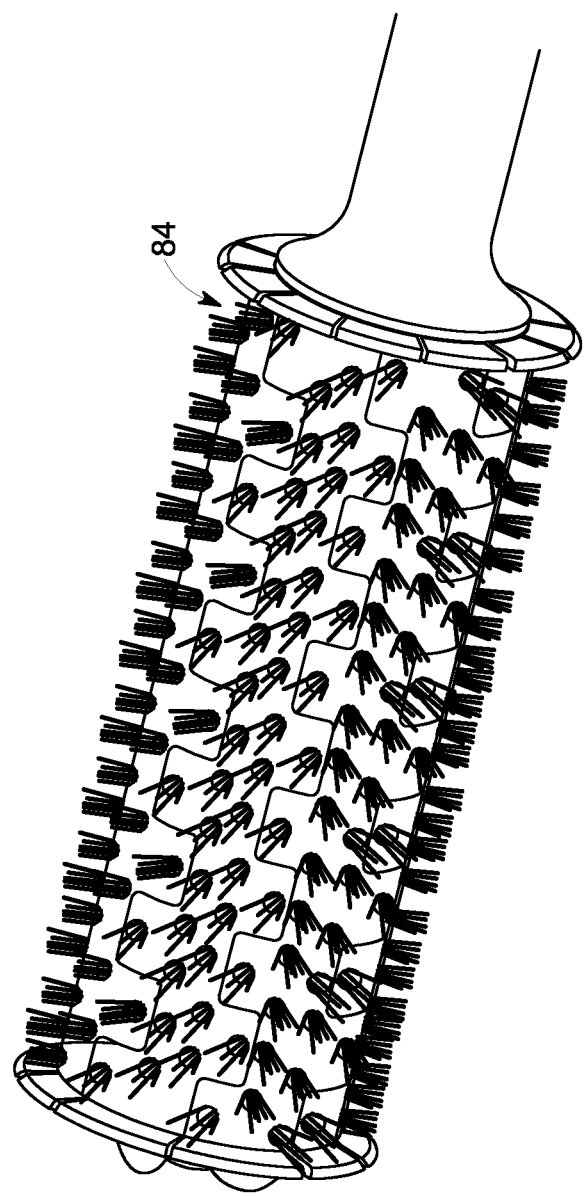
FIG. 39 is a front perspective illustration showing an embodiment of the present invention with rubber bristle plates.

FIG. 39 is a front perspective illustration showing an embodiment of the present invention with rubber bristle plates 84.

Figure 40:
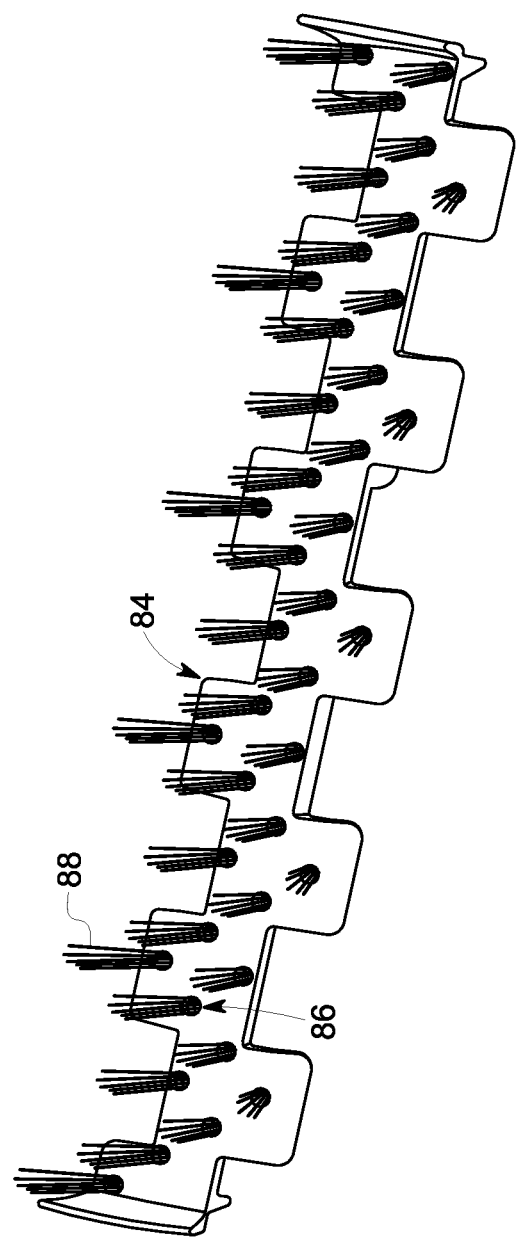
FIG. 40 is front perspective exploded view of a single bristle plate in accordance with the embodiment of FIG. 39.

FIG. 40 is front perspective exploded view of a single bristle plate 84 in accordance with the embodiment of FIG. 39. A rubber bristle attachment plate 84 includes a plurality of bristle attachment points 86 to which bristles 88 are attached.

Figure 41A:
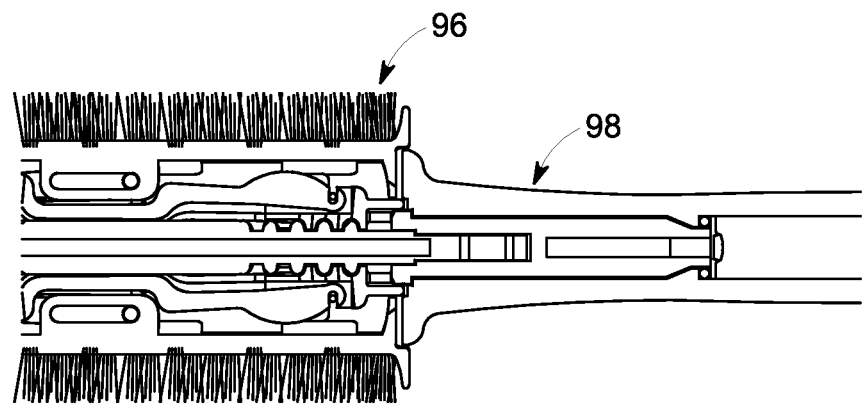
FIG. 41A is a detailed view of a rotating version of an expandable hair brush in accordance with one embodiment.
Figure 41B:
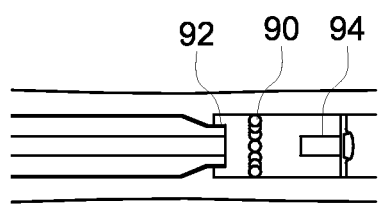
FIG. 41B is a detailed view of a bearing portion of the embodiment of FIG. 41A.

FIG. 41A is a detailed view of a rotating version of an expandable hair brush in accordance with one embodiment. FIG. 41B is a detailed view of a bearing portion of the embodiment of FIG. 41A. This version of the brush may rotate with or without the addition of a motor drive and with or without the addition of a heated air supply. A locking mechanism may also be provided to keep it from rotating when desired. Bearing 90 in bearing race 92 are held in place by cap 94 and assist in smooth rotation of brush 96 about handle 98.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An adjustable diameter mechanism, comprising:
 a plurality of cylinder portions, each of the cylinder portions comprising an arcuate portion of a cylinder and extending along an arc of less than or about 120 degrees of a 360 degree circle and having an inner side and an outer side; and
 the inner side of the cylinder portions coupled to first ends of a scissors mechanism at a pivot point and a slot of the cylinder portions, the scissors mechanism having a first and a second piece pivotally coupled at a pivot coupling, respective second ends of the scissors mechanism coupled to a respective pair of threaded bolts engaged with a screw having opposing threads meeting at a central point thereof,
 wherein the cylinder portions are provided with spring-loaded flaps along their longitudinal edges which are configured to extend when the diameter of the mechanism is increased and retract when the diameter of the mechanism is decreased.

2. The mechanism of claim 1, wherein the second ends of the scissors mechanism are coupled to the bolts with a band which allows them to pivot in a plane away from the screw.

3. The mechanism of claim 1, wherein the outer side of the cylinder portions are provided with brush bristles.

4. The mechanism of claim 1, wherein the cylinder portions are configured to have extending portions which overlap adjacent cylinder portions as the diameter of the mechanism is adjusted.

5. The mechanism of claim 1, wherein the cylinder portions are provided with holes configured to channel heated air.

6. The mechanism of claim 5, further comprising a heater and a fan configured to heat and blow air through the holes.

7. The mechanism of claim 1, further comprising a vibrating element configured to selectively vibrate the mechanism in use.

* * * * *